(12) United States Patent  
Kawase

(10) Patent No.: US 6,665,585 B2
(45) Date of Patent: Dec. 16, 2003

(54) METHOD AND APPARATUS FOR CONTAINER MANAGEMENT

(75) Inventor: Akira Kawase, Higashikurume (JP)

(73) Assignee: Ishikarajima-Harima Jukogyo Kabushiki Kaisha, Tokyo (JP)

( * ) Notice: Subject to any disclaimer, the term of this patent is extended or adjusted under 35 U.S.C. 154(b) by 110 days.

(21) Appl. No.: 09/926,215

(22) PCT Filed: Jan. 30, 2001

(86) PCT No.: PCT/JP01/00612

§ 371 (c)(1),
(2), (4) Date: Sep. 25, 2001

(87) PCT Pub. No.: WO01/56907

PCT Pub. Date: Aug. 9, 2001

(65) Prior Publication Data

US 2002/0161675 A1 Oct. 31, 2002

(30) Foreign Application Priority Data

| Jan. 31, 2000 | (JP) | 2000-027241 |
| Jan. 31, 2000 | (JP) | 2000-027242 |
| Feb. 3, 2000 | (JP) | 2000-025976 |
| Feb. 7, 2000 | (JP) | 2000-029657 |
| Mar. 1, 2000 | (JP) | 2000-056436 |
| Mar. 1, 2000 | (JP) | 2000-056444 |
| Mar. 1, 2000 | (JP) | 2000-056445 |

(51) Int. Cl.$^7$ .............................. G06F 7/00
(52) U.S. Cl. ............... 700/226; 700/225; 414/137.1; 414/139.4; 414/139.9; 340/825.06
(58) Field of Search .............. 700/225, 226; 705/28; 414/560, 561, 137.1, 139.4, 139.9, 140.3, 140.4, 142.6, 142.7, 141.6, 141.7; 340/425.5, 568.1, 572.1, 673, 825.06, 825.54, 825.72, 825.69; 342/463

(56) References Cited

U.S. PATENT DOCUMENTS

| 3,952,891 A | * | 4/1976 | Terayama et al. ............ 414/809 |
| 4,172,685 A | * | 10/1979 | Nabeshima et al. ..... 414/139.7 |
| 4,750,197 A | * | 6/1988 | Denekamp et al. .......... 455/404 |
| 4,884,208 A | * | 11/1989 | Marinelli et al. ........... 701/300 |
| 5,565,858 A | * | 10/1996 | Guthrie ................... 340/10.33 |
| 5,608,412 A | * | 3/1997 | Welles et al. ............... 342/457 |
| 5,656,996 A | * | 8/1997 | Houser ....................... 340/541 |
| 5,691,980 A | * | 11/1997 | Welles et al. ............... 370/316 |
| 5,712,789 A | * | 1/1998 | Radican ...................... 700/226 |
| 5,774,876 A | * | 6/1998 | Woolley et al. ............... 705/28 |
| 5,780,826 A | * | 7/1998 | Hareyama et al. .......... 235/385 |
| 5,907,286 A | * | 5/1999 | Kuma ......................... 340/5.5 |
| 6,190,107 B1 | * | 2/2001 | Lanigan et al. ............. 414/342 |
| 6,304,856 B1 | | 10/2001 | Soga et al. |
| 6,335,685 B1 | * | 1/2002 | Schrott et al. ........... 340/572.1 |
| 6,356,196 B1 | * | 3/2002 | Wong et al. ................ 340/571 |
| 6,356,802 B1 | * | 3/2002 | Takehara et al. ............ 700/215 |

FOREIGN PATENT DOCUMENTS

| JP | 1-214504 | 8/1989 |
| JP | 7-187401 | 7/1995 |
| JP | 9-50484 | 2/1997 |
| JP | 10-181885 | 7/1998 |
| JP | 11-20951 | 1/1999 |
| JP | 11-139516 | 5/1999 |
| JP | 11-240609 | 9/1999 |
| JP | 11-246048 | 9/1999 |
| JP | 11-296581 | 10/1999 |
| JP | 2000-85975 | 3/2000 |

* cited by examiner

Primary Examiner—Khoi H. Tran
(74) Attorney, Agent, or Firm—Oblon, Spivak, McClelland, Maier & Neustadt, P.C.

(57) ABSTRACT

A radio IC number tag (10) having a container number (1a) inputted is applied on a container (1); a radio document tag (14) having container (1) physical distribution information inputted is set to a trailer (2); and a radio antenna (11) is arranged at a gate of a container terminal. Upon passage of the trailer (2) through the gate, the radio antenna (11) receives the physical distribution information transmitted from the radio IC document tag (14) while reading the container number from the radio IC number tag (10) applied on the container (1). Such information is sent to a physical distribution information center (31). A computer (31a) in the physical distribution information center (31) checks up the container number (1a) with the physical distribution information and the like for confirmation and data-processing to send a command signal for a storage address to the trailer (2) through the radio antenna (11).

6 Claims, 42 Drawing Sheets

FIG. 1

CONTAINER CARGO CARRY-IN VOUCHER

| NAME OF DEALING SHIPPING COMPANY | ☐Japan Line ☐K Line ☐MO Line ☐NYK Line<br>☐Showa Line ☐YS Line ☐SK Line ☐Toyo Line<br>☐AJCL ☐ANL ☐Ben Line ☐CMCR<br>☐FBS ☐Hapag-Lloyd ☐Lauro Line ☐Lloyd Triestino<br>☐Mdersk Line ☐NOL ☐OCL ☐OOCL<br>☐Scan Dutch ☐OTHERS: |  |  |  |  |  |
|---|---|---|---|---|---|---|
| NAME OF SHIP | Voy. No. |  |  |  |  |  |
| CONTAINER NO. |  | KIND OF CONTAINER | SIZE | 20 | 40 | OTHERS |
| SEAL NO. |  |  | TYPE | DRY \| REEFER \| FLAT RACK \| OPEN-TOP |  |  |
|  |  |  |  | OTHERS |  |  |
| GRWT (INC. CONTAINER'S OWN WEIGHT) | K/T | CARGO STYLE | Ordinary \| Reefer \| Dangerous \| OTHERS |  |  |  |
| PORT OF LANDING |  | DANGEROUS ITEM CLASSIFICATION |  |  |  |  |
| P.O.L. SERVICE | CY or DOOR | CFS | FREEZING TEMP. | (°F) | (°C) |  |
| NAME OF CARGO OWNER |  | CUSTOM OFFICE | PASSED | NOT PASSED |  |  |
| NAME OF DEALING CARGO DISTRIBUTOR<br><br>TEL:( ) | WE CERTIFY THAT ALL OF DESCRIPTIONS OF THIS VOUCHER IS ACCURATE.<br>THIS DAY OF<br>NAME OF COMPANY AND<br>SIGNITURE OF RESPONSIBLE PERSON |  |  |  |  |  |

| (SPACE FOR USE AT TERMINAL) | WITH OR WITHOUT DOCUMENT? | D/R \| CLP \| E/D |  |  |
|---|---|---|---|---|
|  | CONTAINER STORAGE SITE | LOCATION | ROW | BAY | TIER |
|  |  | CONTAINER YARD |  |  |  |
|  |  | MARSHALLING YARD |  |  |  |
|  | TOD OF CARRY-IN |  |  |  |  |

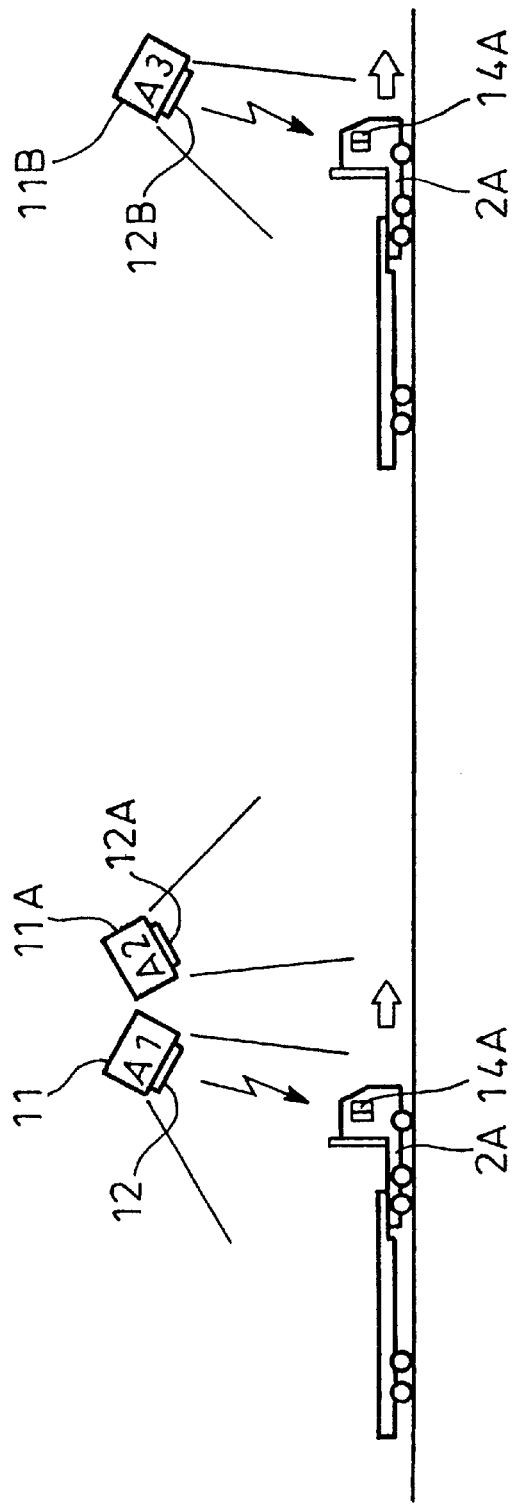

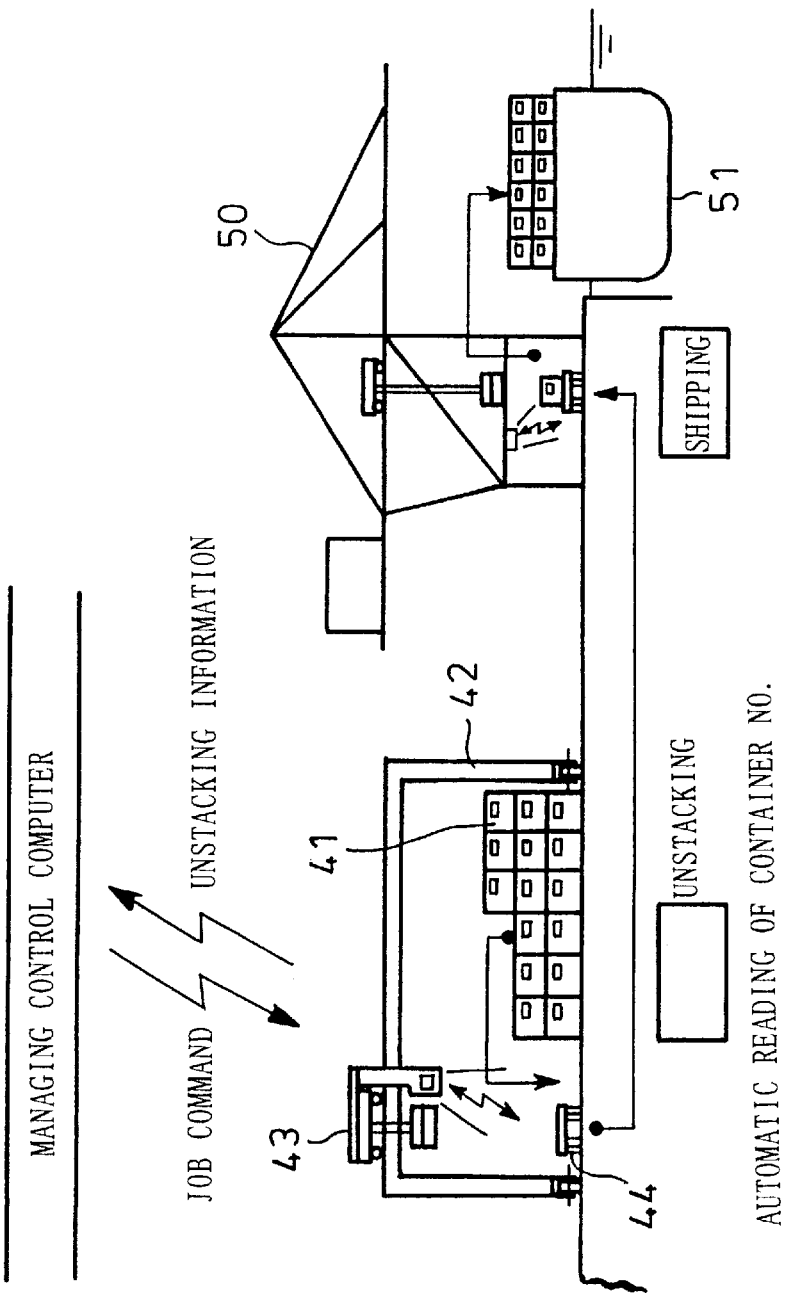

AUTOMATIC READING OF CONTAINER NO.

METHOD AND APPARATUS FOR CONTAINER MANAGEMENT

TECHNICAL FIELD

The present invention relates to container managing apparatus and method for carrying a container in and out of a container terminal in a port, loading and unloading a container in and out of a container yard by a yard crane (yard cargo handling machine) and shipping and unshipping a container in and out of a container ship by a container crane. It further relates to inside transportation carriage and method employed in the container managing apparatus and method for delivering a container between on the one hand the container crane which loads and unloads the container in and out of the container ship and on the other hand the yard crane which loads and unloads the container at a designated address in the container yard, or between the yard crane and another yard crane.

BACKGROUND ART

A container terminal is located at a cross point of land and marine transportations at which containers are transferred between different types of transportation means such as a container ship and a trailer (chassis). Once cargoes are packed in a container, one will know attributes of the cargoes such as kind, weight, destination and owner from a container number applied on each container and a voucher issued when the cargoes are packed in the container. The information is always transmitted with the container number and the voucher describing the attributes being as one set.

A container will pass through an entrance gate of a container terminal in a case of, for example, (1) carry-in of a container packed with cargoes (loaded containers) upon exporting thereof; (2) carry-out of a loaded container upon importing thereof; (3) carry-in of a container from which cargoes have been unpacked (empty containers) upon storage of the empty containers; and (4) carry-out of an empty container upon packing of cargoes. A container and a trailer will pass through an exit gate of the container terminal in a case of, for example, (1) exit of an empty trailer from which a container packed with cargoes (loaded container) has been transferred to a container yard; (2) carry-out of a loaded container; (3) carry-out of an empty container in which cargoes are to be packed; and (4) exit of an empty trailer from which an empty container has been transferred to the container yard.

FIG. 1 shows a containerized cargo carry-in voucher which describes physical distribution information such as the kind, weight, destination, owner and container number of cargoes. The container is carried in together with the carry-in voucher.

FIG. 2 is a perspective view of the container. Reference numeral 1 denotes a container. A container number 1a is entered on each of the top surface and front, rear, left and right side surfaces of the container 1. The container number 1a is defined by the ISO and, for example, includes eleven characters of ABZU 0012346. In the Figure, four characters are assigned as an owner code in which a capital U in the last is a common code to indicate a container. A number includes a 6-digit set of numerals and one numeral used in checking an error in the code and number is attached at the end. As a consequence, the container number 1a is shown as an 11-digit set of characters in total.

FIG. 3 is a rear perspective view of the container deposited on a trailer. In the figure, reference numeral 1 denotes the container. The container 1 is deposited on a trailer 2 with handles of closing doors 1b being sealed by a seal 3.

FIG. 4A is a plan view of an example of a conventional seal and shows a state before sealing. The seal 3 comprises a cover 3a and a band 3b. A protrusion 3c is provided at a tip end of the band 3b and a seal number 3d is impressed on the band 3b. The band 3b is made of color steel sheet iron. FIG. 4B shows a state after sealing; by bending the planar band 3b and inserting the protrusion 3c through a hole (not shown) on the cover 3a to be caulked, the seal 3 forms a loop that will not open again unless it is broken. It should be appreciated that the seal 3 is not limited to that of the above-mentioned band type and may be of various kinds including rod and wire types.

FIG. 5 is a conceptive view of conventional carry-out (import) and -in (export) management of a container at the terminal entrance and exit gates. Upon carry-out or -in of a loaded container to import or export cargoes, the loaded container 1 with the container number 1a entered on each of its top, front, rear, left and right surfaces is deposited on the trailer (chassis) 2 and transported to the container terminal. The trailer 2 stops once when it arrives in front of a check-in booth 4 of the terminal entrance or exit gate and an operator (driver) of the trailer hands the voucher (containerized cargo carry-out or -in voucher) having been brought with him or her and describing the physical distribution information such as the shipping company, the name of the ship and the container number to a gateman (staff) to perform the container carry-out or -in procedure with the voucher. The gateman places the voucher on a camera table in the check-in booth 4 and transmits the content thereof to a clerk room (not shown) and transmits the seal number after he or she has confirmed whether the seal is sealed completely or not. Also, when the trailer 2 has stopped, a camera 7 provided above each of the terminal entrance and exit gates photographs the container number 1a entered on the container 1 and transmits it to the clerk room. In the clerk room, a clerk confirms the content of the carryin voucher, the container number and seal number on the CRT screen and then inputs the same into the computer, whereby a container storage address in the container yard at the terminal, whether carry-out of the loaded container is allowed or not, etc. are determined by the computer, and the clerk prints out a destination or exit permit voucher from a printer booth 6. Meanwhile, the driver starts to and stops again in front of the printer booth 6, and receives the destination or exit permit voucher to move to an designated position in the container yard or exit. Reference numeral 5 denotes a crossing gate.

FIGS. 6 and 7 show a flowchart showing a summary of the conventional carry-out (import) or -in (export) management of the container at the container terminal, which is divided into two along a direction of the flow (FIGS. 6 and 7 show the upstream and downstream sides, respectively) with A and B being connections.

In the case of exporting cargoes, as shown in FIGS. 6 and 7, the owner initially makes a reservation for a ship and prepares a document (containerized cargo carry-in voucher) which will be described below, and then requests a marine cargo distributor to transport a container. The distributor performs a procedure for export at a container custom office, and packs the cargoes into the container after the procedure for export is completed. When the packing job is completed, an operator (driver) of a trailer deposits the container on the trailer, and starts with the document being brought with him or her to a gate of the container terminal. When arriving at the gate, the driver passes the document to the gateman (staff). Upon receipt of the document, the gateman sets the document on the camera table and presses a button to photograph the document so that data is transmitted to a management room where it is displayed on a CRT screen. In the management room, the data is inputted into the computer with view of the CRT screen. Based on the data, the computer determines a container deposit address within the container yard in the container terminal. When the container deposit address (the spot of delivery with a yard crane) is determined, it is printed on a yard destination voucher in the management room and is passed to the driver. The information of the container deposit address is also transmitted to a terminal installed on the yard crane (yard cargo handling machine). Upon receipt of the yard destination voucher, the driver confirms the destination and drives the trailer to and stops at the destination address. When the trailer arrives at the container deposit address, the operator of the yard crane confirms the container number and storage address displayed on the terminal on the trailer, and lifts up the container by the yard crane and puts it down at the designated address (storage spot) in the container yard for storage. The operator of the yard crane presses a complete button when the container storage job is completed to update the data in the computer. As the container is lifted up by the yard crane, the driver of the trailer confirms the lifting and heads off to the gate of the container terminal to exit. Then, the container stored in the container yard is deposited on an inside transportation carriage (trailer or the like) by the yard crane and moved to under the container crane, so that the container is shipped by the container crane into the container ship at its predetermined address.

The yard crane (yard cargo handling machine) may be a tire type transfer crane in the form of a gantry crane which has tires at its legs and has a traverse trolley on its girder and which runs astride the containers stacked in 5 or 6 stages and 5 or 6 lines; a rail type transfer crane arranged in the same manner as above to run on rails astride the containers stacked in 5 or 6 stages in 9 or 10 lines; a straddle carrier in the form of a gantry carriage which has tires at its legs to run while keeping a single container lifted up; or an overhead traveling crane which runs on rails constructed in the air, etc.

On the other hand, in the case of importing the cargoes, prepared is a document filled with physical distribution information similar to that on the document prepared in the case of exportation; and an empty container is transferred in a manner opposite to that upon exporting. The container is moved in a direction opposite to the above-described direction to be transported outside by the trailer.

Thus, at the container terminal, a yard crane (yard cargo handling machine) cooperates with an inside transportation carriage (trailer) upon storage of a container in a container yard, carry-out of a container for import, stacking or unstacking of a container unshipped or to be shipped and re-transferring (marshalling) of a stored container for convenience of shipping; and a container crane cooperates with an inside transportation carriage upon shipping and unshipping of a container. In this connection, that which runs on an ordinary road is referred to as a trailer whereas that which runs only within a container terminal are referred to as an inside transportation carriage or simply as a carriage.

Here, the operators of the yard crane (yard cargo handling machine), the container crane and the inside transportation carriage will store and unload the container in accordance with a procedure prepared at a physical distribution center in the container terminal.

More specifically, a procedure manual for the operator of the yard crane (yard cargo handling machine) describes the container number, the number of the trailer or carriage for carry-in or -out of the container, the address where the container labeled with the above number is to be stored, the address where the container labeled with the above number is currently stored, etc.; and the operator of the yard cargo handling machine stores or unloads the container in accordance with the procedure by visually confirming the container number and trailer or carriage number.

Also, a procedure manual for the operator of the container crane describes the container number, the address in the container ship where the container is to be deposited, an order of unloading the containers, etc.; and the operator proceeds with the operation by confirming the container number entered on the container as well as the number of the inside transportation carriage which transports the container.

Further, a procedure manual for the operator of the inside transportation carriage describes the location of the container crane or yard crane (yard cargo handling machine) where the empty carriage is to stop by to deposit a container, and the location of the container crane or yard crane where the carriage having the container deposited thereon is to stop by to withdraw the container; and the driver proceeds with the operation by confirming the number of the container to be extracted.

However, with the conventional management method of carry-in and -out of containers, the gateman at the terminal gate has to check whether the seal is complete or not and read and input the seal number, which may induce an input error.

Also, the trailer stops at the terminal entrance or exit gate and the gateman confirms the sealing and transmits the seal number as has been discussed. The gateman also transmits a video of the voucher which the driver is carrying with him or her to the clerk room, and then the camera provided at the terminal entrance or exit gate photographs the container number entered on the container, which is confirmed on the CRT screen in the clerk room and manually inputted into the computer, thereby possibly causing an input error. Also, the driver is kept waited at the terminal entrance or exit gate, and after starting off, he or she has to stop again in front of the printer booth to receive the destination or exit permit voucher, which makes transportation efficiency of a container poor.

Moreover, in the conventional container management method in shipping and unshipping containers, etc. which relies on visual confirmation, once a human error occurs, the job procedure is disturbed, which may lower cargo handling efficiency. Furthermore, it is impossible to automate a cargo handling operation.

The present invention is devised to solve the above problems in the prior art, and therefore has its object to provide a container managing apparatus and method which can radio-control and automate operations such as reading and confirmation of physical distribution information, reading and confirmation of the container number, confirmation of sealing by the seal and reading and confirmation of the seal number at the terminal entrance or exit gate, and further, storage, carry-out, stacking or unstacking of a container unshipped or to be shipped, marshalling, stocktaking, and shipping or unshipping, thereby enhancing efficiency in transferring a container.

SUMMARY OF THE INVENTION

According to the invention, in a case of carry-in of a container for export, the cargoes are packed in an empty container labeled with a radio IC number tag into which a container number (container information) sent from the shipping company has been inputted. Upon completion of the packing, the closing doors of the container are closed and sealed by attaching a radio IC seal tag (container information input medium) supplied from the shipping company and capable of sending a seal number (container information) only in the state of sealing. Then, the container is deposited on a trailer (container transporting body) to which is set a radio IC document tag (physical distribution information input body) having physical distribution information inputted; the trailer is conveyed to the terminal entrance gate (check point). At the entrance gate, a radio antenna arranged there receives the physical distribution information from the radio IC document tag of the trailer and transmits the information to a computer in a physical distribution information center while the radio antenna also reads the container number from the radio IC number tag applied on the container and having the container number inputted as well as the seal number from the radio IC seal tag having the seal number inputted. The radio antenna transmits such information to the physical distribution information center where the computer checks it up with physical distribution information having been received from the shipping company and inputted beforehand and that of the radio IC document tag, etc., to confirm whether the container number and seal number are coincident with those of the physical distribution information of the above-mentioned radio IC document tag. The computer performs data processing to compute a storage address and instructs it through the radio antenna to the trailer. Here, the computer at the information center checks the information received and, when the information has discrepancy, instructs through the radio antenna the empty trailer to move to a turnout yard. In the turnout yard, an attendant gives an instruction to the driver.

On the other hand, in a case where an empty trailer exits through the exit of the container terminal after it has transferred a loaded container to a container yard for export or it has transferred an empty container to the container yard for storage, upon passing of the empty trailer through the exit gate of the container terminal, the radio antenna receives the physical distribution information from the radio IC document tag on the empty trailer and transmits the same to the physical distribution information center. The computer in the information center checks it up with the physical distribution information obtained beforehand from the shipping company to confirm the coincidence with that of the radio IC document tag, and upon confirmation of the coincidence, the computer grants through the radio antenna exit permission to the empty trailer.

Further, in a case of carry-out of an imported container, the driver of the empty trailer passes through the terminal gate, deposits a container on the empty trailer at the storage address in the container yard, and exits from the terminal through the terminal gate. Since the radio IC number tag has been applied on the container, as is with the carry-in (export) of the container, the container number can be read and confirmed by a reader of the radio antenna at the terminal gate.

As has been discussed, since the procedures at the terminal entrance and exit gates are performed by radio-controlled jobs, the procedures can be automated to omit manual input jobs, thereby eliminating a possibility of an input error by manual input. Since the driver can go through the terminal entrance and exit gates without stopping there, transfer efficiency of a container can be improved. Further, since the radio IC seal tag attached to the closing doors of the container and the radio antenna provided at the terminal gate are used to read the seal number and since the radio IC number tag applied on the container and having the container number inputted and the radio antenna provided at the terminal gate or the like are used to precisely read the container number, it is possible to automate procedures at the terminal gate through radio-controlled jobs, thereby eliminating an input error.

In this respect, in carry-out and -in of the container, an IC card (radio IC card) having physical distribution information inputted may be prepared to be set to a terminal installed on a trailer, and the trailer moves to the gate of the container terminal. In this case, upon passing of the trailer through the gate, the terminal on the trailer transmits the physical distribution information of the IC card through a terminal on the gate to the physical distribution information center where it is subjected to data processing so as to instruct a container delivery spot with a yard crane (yard cargo handling machine) to the trailer through the terminal on the gate, while identification information of the trailer or container, the container delivery spot with the trailer and a container storage spot are instructed to a terminal installed on the yard crane. Upon completion of the storage or withdrawal of the container, the terminal on the yard crane transmits information on the completion to the physical distribution information center, so that the information center updates the data of container storage information. As a result, the procedures of carry-out and -in of the containers using containerized cargo carry-in vouchers at the gate of the container terminal can be omitted, thereby making it possible to improve transfer efficiency of the container.

Also, according to the invention, in a case of loading a container in the container yard by the yard cargo handling machine, a radio antenna is arranged on the machine to receive container number information in the form of radio waves from a container number tag applied on the container and to check up the same with job order information from a host computer. As a result, different from the conventional method in which an operator visually confirms the container number to check up the same with the job procedure, there is virtually no room of a human error. Also, in the case of unstacking, besides the container number, carriage number information of a carriage on which the container is to be deposited is automatically obtained and checked up with the job order information. Thus, there is virtually no room of a human error in this case, either. Hence, the job procedure will not be disturbed by a human error and cargo handling efficiency is improved.

Further, according to the invention, in a case of shipping by a container crane, a radio antenna is arranged on the container crane to receive container number information in the form of radio waves from a container number tag applied on the container and to check up the same with job order information from a host computer. As a result, different from the conventional method in which an operator visually confirms the container number to check up the same with the job order, there is virtually no room of a human error. Also, in the case of unshipping, besides the container number, number information of a carriage on which the container is to be deposited is automatically obtained and is checked up with the job order information. Thus, there is virtually no room of a human error in this case, either. Hence, the job procedure will not be disturbed by a human error and cargo handling efficiency is improved.

Furthermore, according to the invention, a carriage number tag is applied on an inside transportation carriage, so that the number thereof can be automatically read by the container crane or yard crane (yard cargo handling machine). As a result, there is virtually no room of a human error that an operator of the container crane or yard crane may load the container with the number instructed in the job order list on a carriage other than that instructed in the job order list. Hence, the job procedure will not be disturbed by a human error and cargo handling efficiency is improved.

BRIEF DESCRIPTION OF THE DRAWINGS

FIG. 1 is a view showing a containerized cargo carry-in voucher;

FIG. 16A is a conceptive view when an empty trailer enters for carry-out of a loaded or empty container;

FIG. 26B is a front view showing unstacking of a container for shipping;

BEST MODE FOR CARRYING OUT THE INVENTION

FIGS. 8 through 19 are views showing a first embodiment to achieve managing apparatus and method of carry-in and -out of a container at the container terminal.

Figure 8:
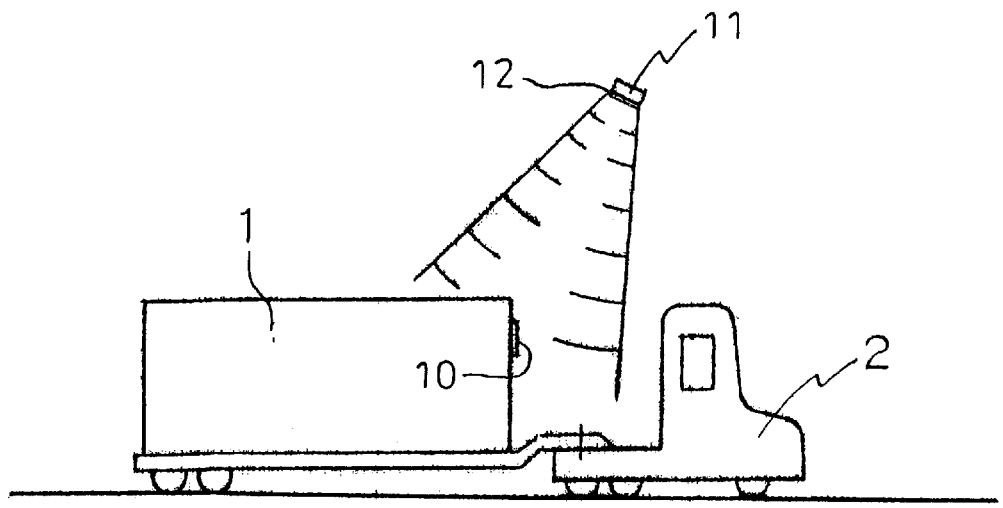
FIG. 8 is a conceptive view of an apparatus for managing carry-in and -out of a container at the container terminal, and shows relationship between a radio IC number tag and a radio antenna.

In FIG. 8, reference numeral 1 denotes a loaded container deposited on a trailer (chassis or container transporting body) 2. Reference numeral 10 denotes a radio IC container number tag (radio IC number tag or container information input medium) applied on a front surface of the container 1. The radio IC number tag 10 incorporates, for example, a coil 10b and an IC 10a as shown in FIG. 9B and the container number has been inputted into the IC 10a. The radio IC number tag 10 is adapted to send a signal not in the normal state but upon supply of power by radio waves from a reader 12 on a radio antenna 11.

Figure 2:
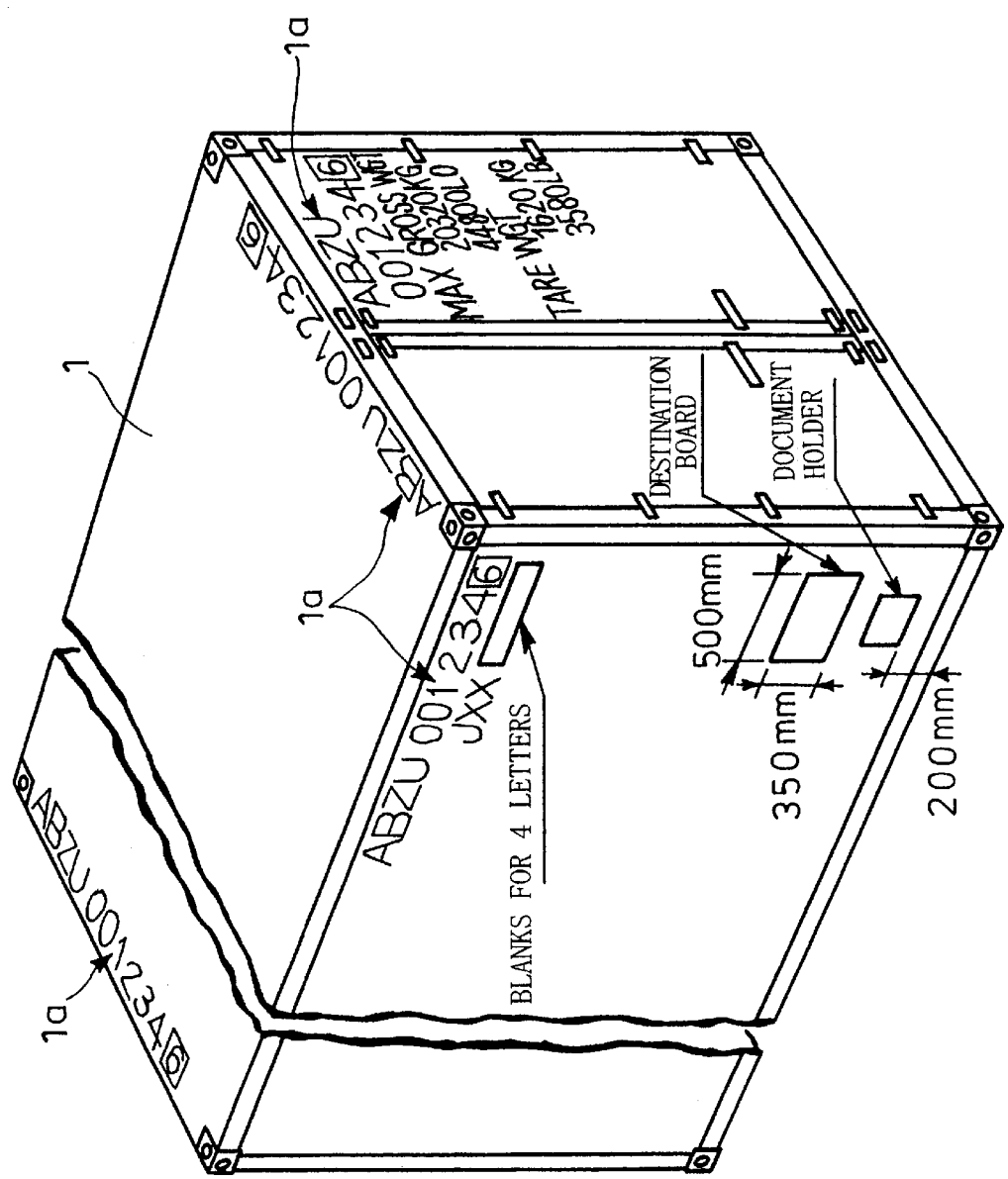
FIG. 2 is a perspective view of a container.
Figure 3:
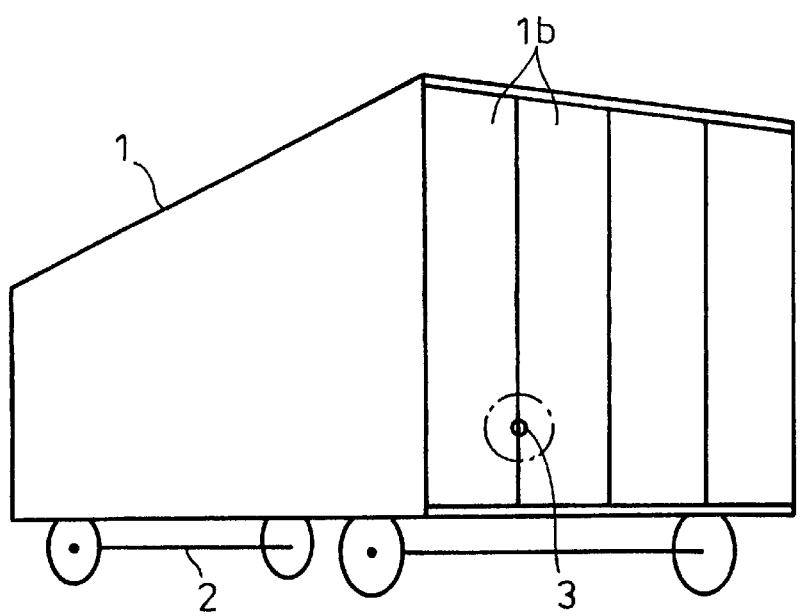
FIG. 3 is a rear perspective view of a container deposited on a trailer.
Figure 4A:
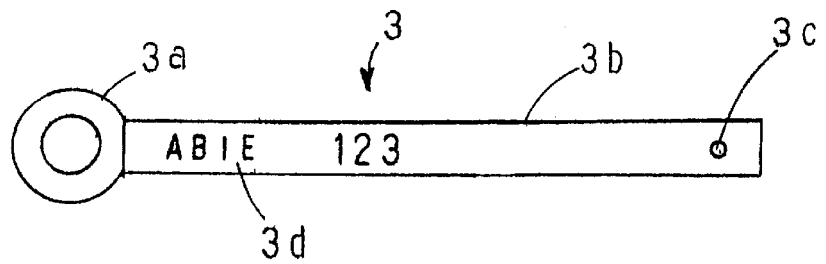
FIG. 4A is a plan view showing a conventional seal.
Figure 4B:
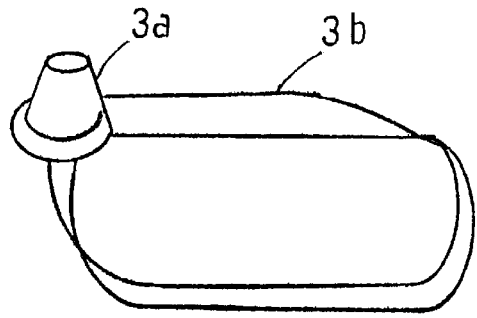
FIG. 4B is view showing a state of sealing.
Figure 5:
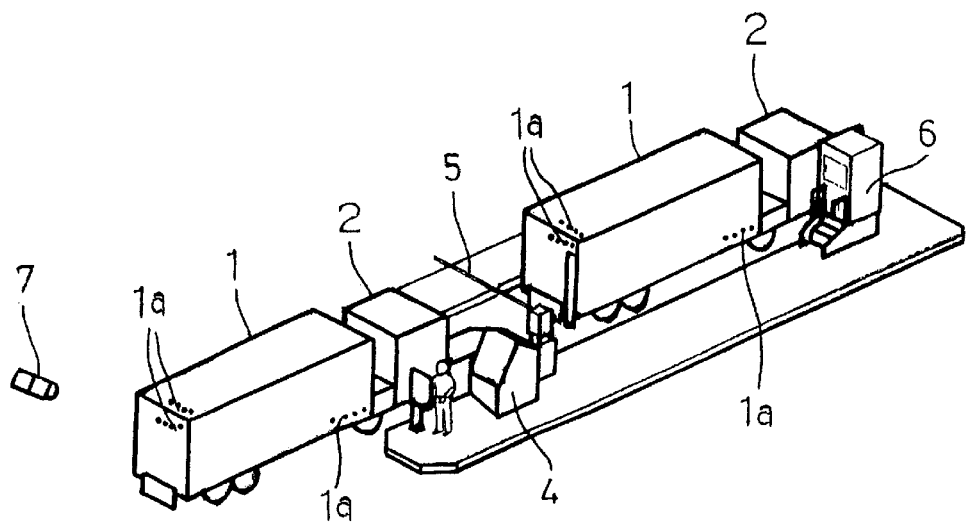
FIG. 5 is a conceptive view of the conventional management of carry-out (import) and -in (export) of a container at a terminal entrance or exit gate.
Figure 6:
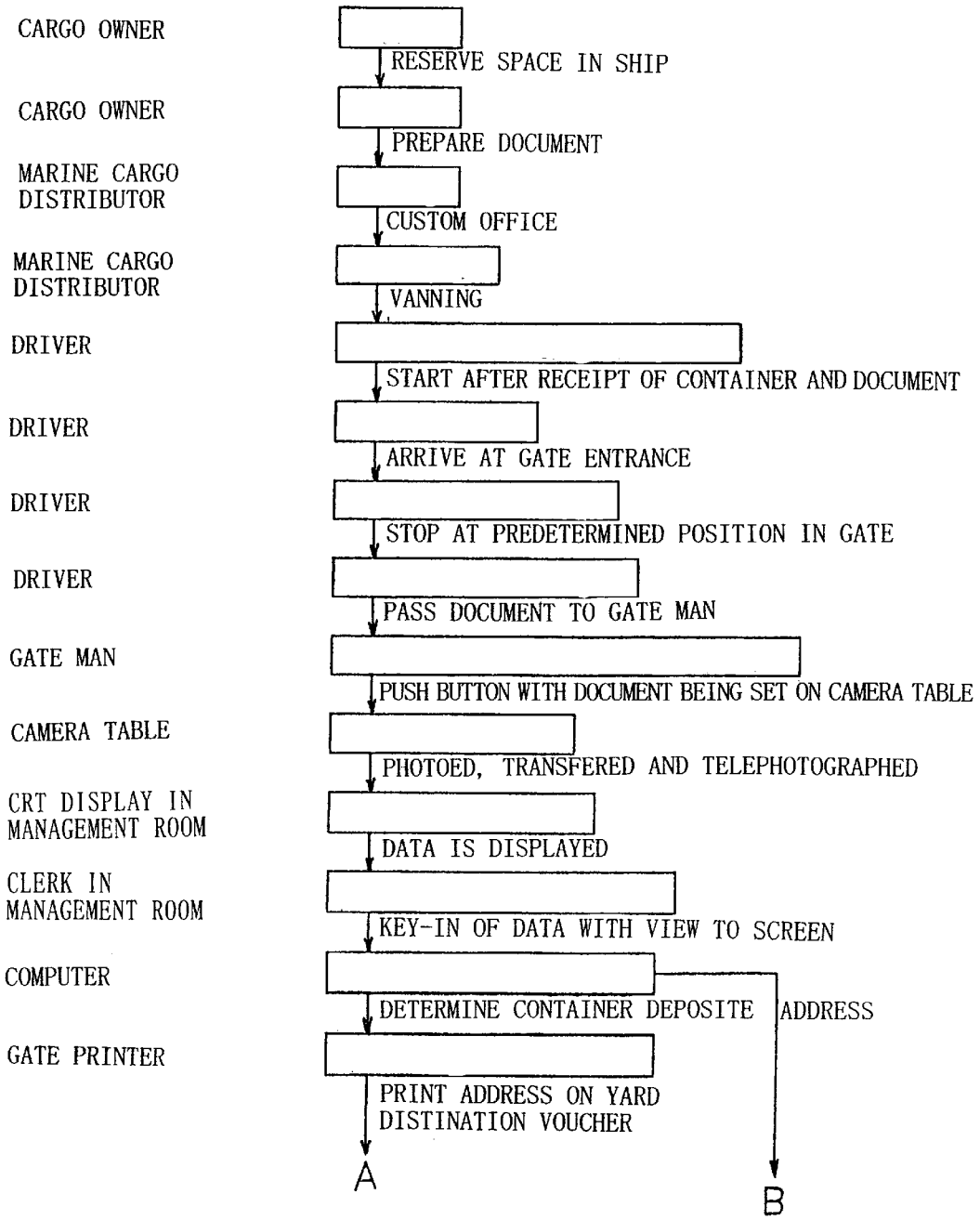
FIGS. 6 and 7 show a flowchart showing an outline of the conventional carry-out (import) and -in (export) management of a container at a container terminal, which is divided in two along a direction of the flow (FIGS. 6 and 7 show the upstream and downstream sides, respectively) with A and B being connections.
Figure 7:
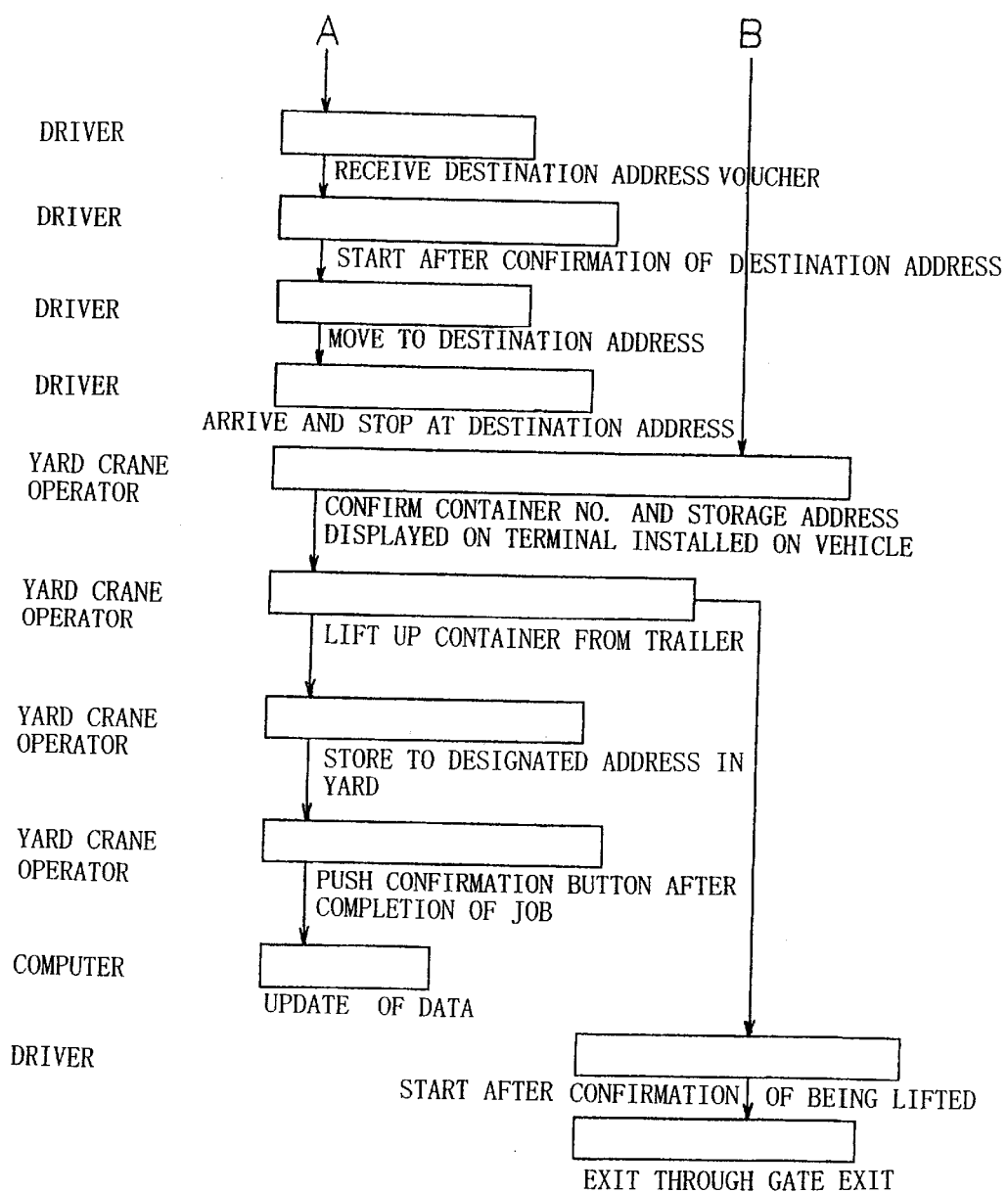
Figure 10:
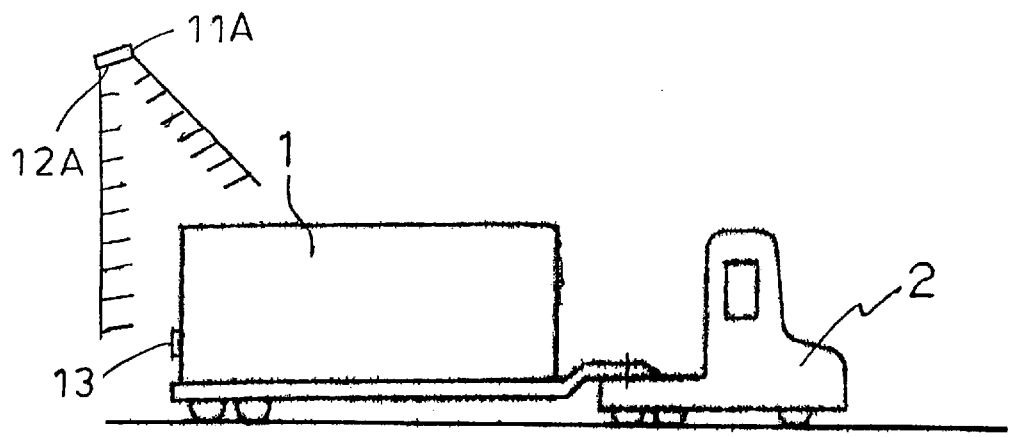
FIG. 10 is a conceptive view of the apparatus for managing carry-in and -out of a container at the container terminal, and shows relationship between a radio IC seal tag and a radio antenna.
Figure 11A:
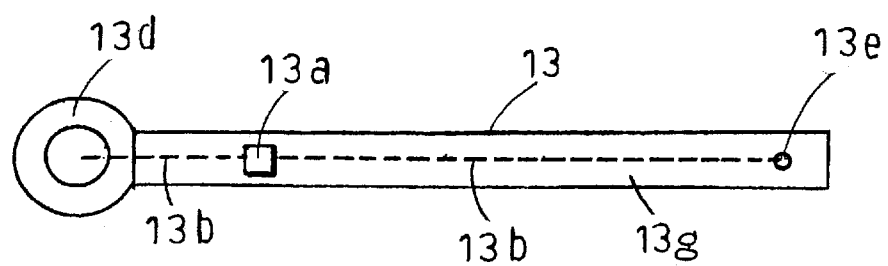
FIG. 11A is a plan view of the radio IC seal tag before sealing.
Figure 11B:
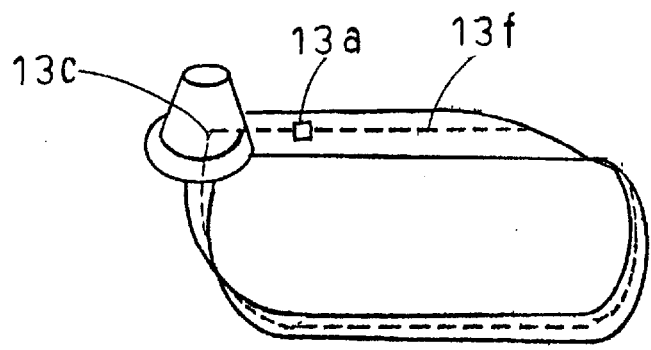
FIG. 11B is a perspective view of the radio IC seal in the state of sealing.
Figure 12:
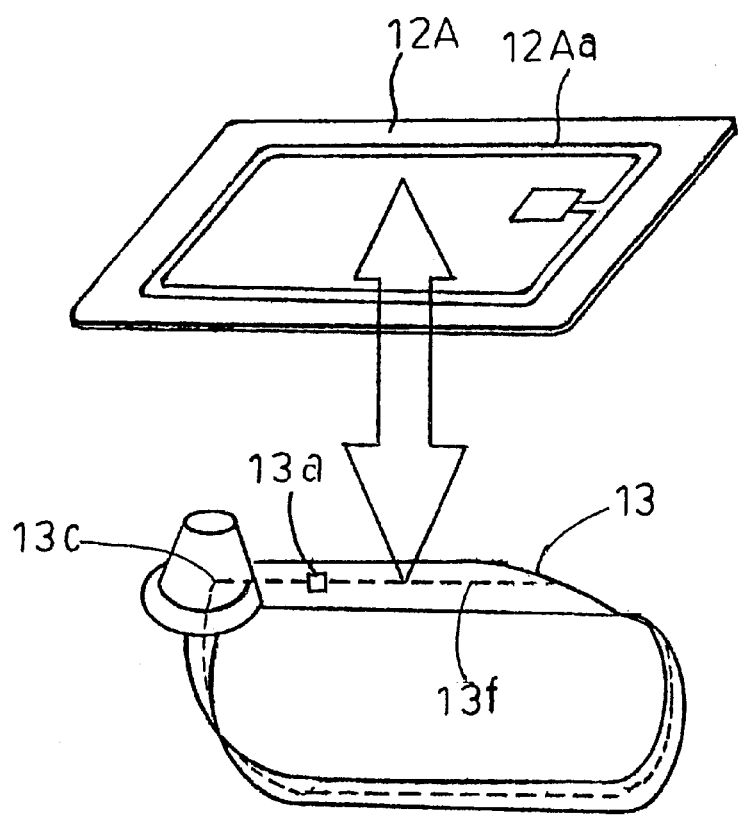
FIG. 12 is a view showing an operation principle of the reader and radio IC seal tag shown as examples.

In FIG. 10, reference numeral 13 denotes a radio IC seal tag (container information input medium) which has sealed the closing doors 1b (see FIG. 3) on the rear surface of the container 1. As shown in FIG. 11A, the radio IC seal tag 13 has a cover 13d and a band 13g made of plastic or FRP. A protrusion 13e is provided at the tip end of the band 13g. An IC chip 13a and a wire 13b are embedded in the band 13g, and tip ends of the wire 13b reach interiors of the protrusion 13e and cover 13d, respectively. As shown in FIG. 11B, upon sealing, the band 13g is bent to insert the protrusion 13e into a hole (not shown) formed at the bottom of the cover 13d to be caulked, whereupon the radio IC seal tag 13 forms a loop, while the tip ends of the wire 13b are connected to each other to form a contact 13c. Thus, a loop-shaped closed circuit is completed and the radio IC seal tag 13 is allowed to send a signal. In this manner, once the radio IC seal tag 13 is sealed, it will never be opened unless it is broken. The radio IC seal tag 13 does not send a signal in the normal state, and is adapted to send a signal upon supply of power from a reader 12A on a radio antenna 11A.

Figure 13:
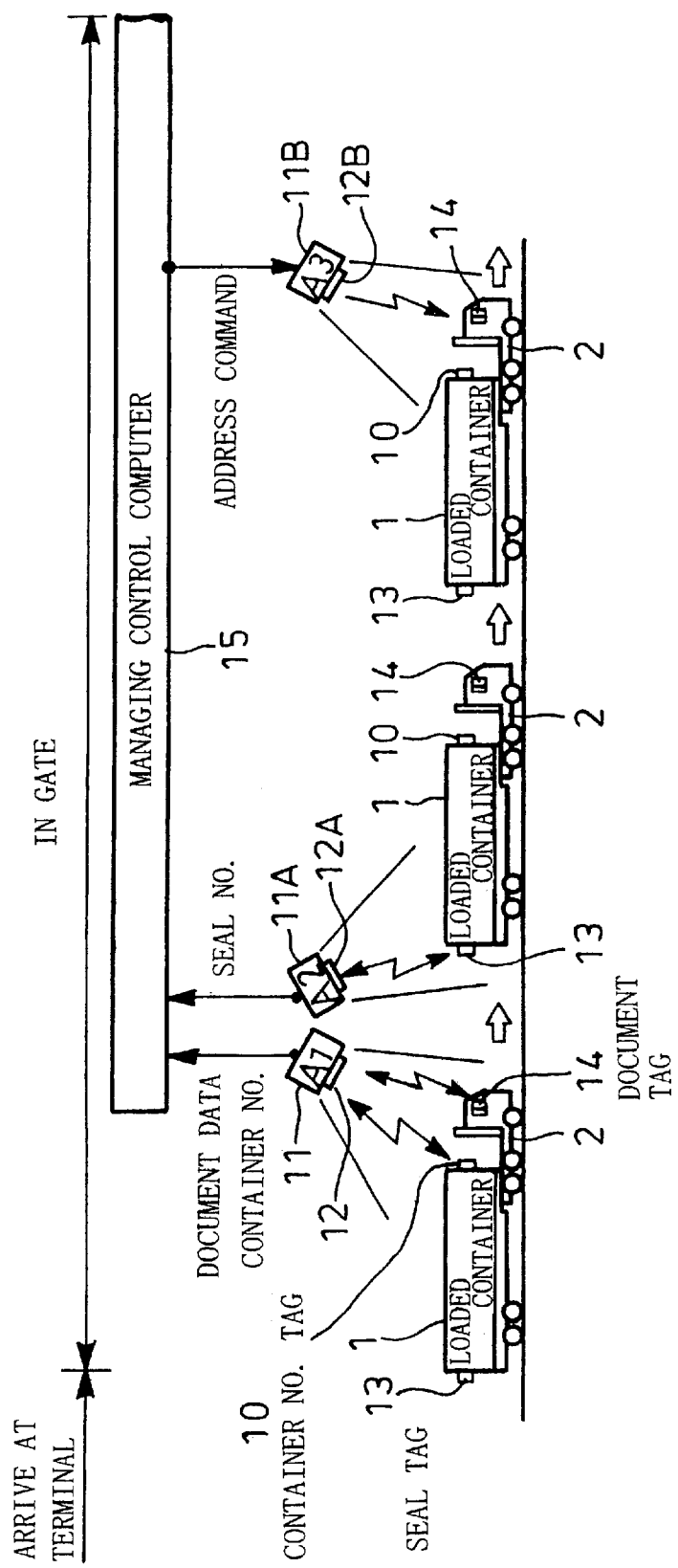
FIG. 13 is a conceptive view of an apparatus for managing a container at the entrance of the container terminal.

In FIG. 13, reference numeral 14 denotes a radio IC document tag (physical distribution information input medium). Physical distribution information for carry-out of the loaded container such as the kind, weight, owner, and container number of the cargoes, has been inputted into the radio IC document tag 14.

Reference numeral 11 denotes a first radio antenna which is provided at the entrance gate (check point) of the terminal and which is tilted to direct the reader 12 backward for reception and transmission of the physical distribution information mainly in relation to the radio IC document tag 14, while reading the container number from the radio IC number tag 10 applied on the container 1. Reference numeral 11A denotes a second radio antenna which is tilted to direct the reader 12A frontward to read the seal number, etc. mainly from the radio IC seal tag 13 attached to the closing doors of the container. Reference numeral 11B denotes a third radio antenna which is provided ahead of the first and second radio antennas 11 and 11A and which is tilted to direct a writer 12B backward to transmit information such as the storage address mainly from the physical distribution information center to the trailer 2. Reference numeral 15 denotes a computer at the physical distribution information center.

Figure 9A:
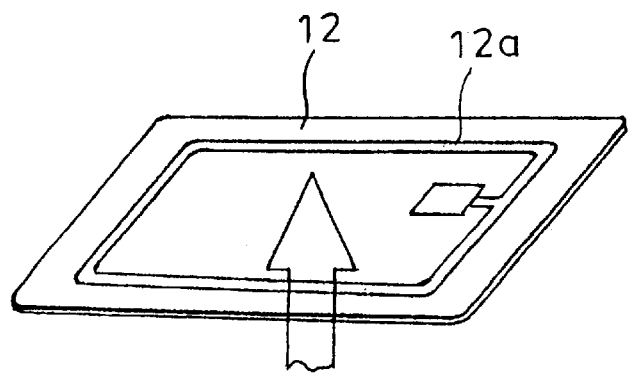
FIG. 9A is an enlarged schematic view of a reader of the radio antenna.
Figure 9B:
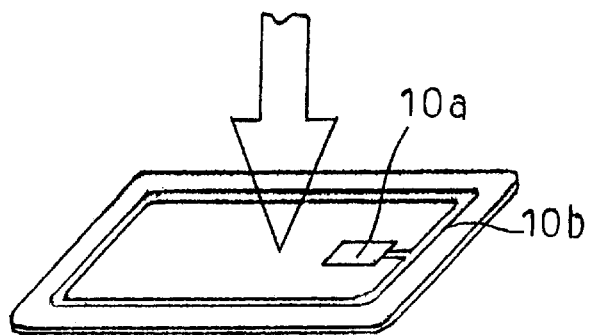
FIG. 9B is an enlarged schematic view of a radio IC tag of the container.

The readers 12 and 12A of the radio antennas 11 and 11A respectively incorporate, for example, coils 12a and 12Aa as shown in FIGS. 9A and 12A, and respectively send radio waves of an adequate wavelength to the radio IC number tag 10 and radio IC seal tag 13 when the trailer 2 having the loaded container 1 deposited thereon comes to the terminal entrance or exit gate, thereby allowing the radio IC number tag 10 to transmit the container number and the sealed radio IC seal tag 13 to transmit the seal number. Upon receipt of these signals, the readers 12 and 12A read the container number and seal number, respectively, and then transmit them to the computer 15 in the physical distribution information center. Here, the writer 12B of the third radio antenna 11B is arranged in the same manner as the reader 12.

Figure 14:
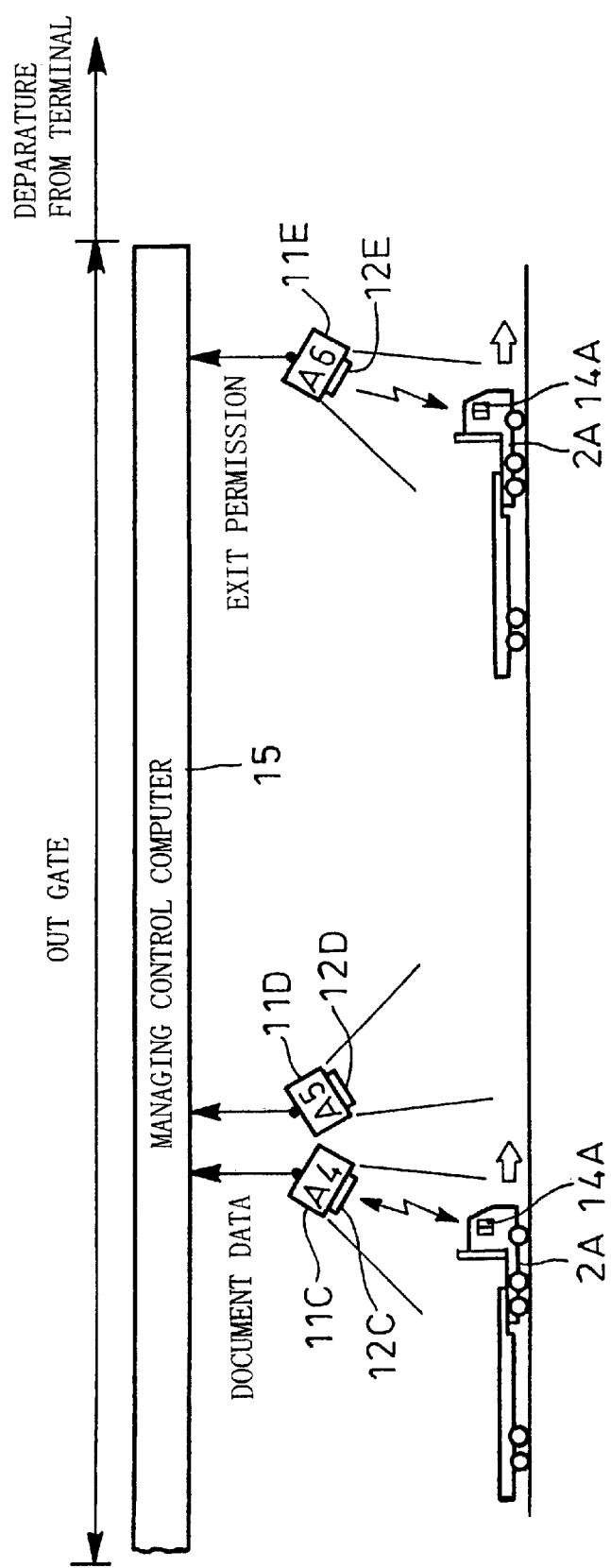
FIG. 14 is a conceptive view of an apparatus for managing a container at the exit of the container terminal.

On the other hand, in FIG. 14, reference numeral 2A denotes an empty trailer which is to exit through the exit of the container terminal after it has transferred the loaded or empty container to the container yard. Reference numeral 11C denotes a first radio antenna which is provided at the exit (OUT) gate (check point) of the terminal and which is tilted to direct a reader 12C backward for reception and transmission of the physical distribution information in relation to a radio IC document tag 14A on the empty trailer 2A, while reading the container number from the radio IC number tag applied on the loaded or empty container and having the container number inputted, which will be described later. Reference numeral 11D denotes a second radio antenna which is tilted to direct a reader 12D forward to read the seal number from the radio IC seal tag 13 attached to the closing doors of the container and having the seal number inputted, which will be described later. Reference numeral 11E denotes a third radio antenna which is provided ahead of the first and second radio antennas 11C and 11D and which is titled to direct a writer 12E backward to transmit information such as exit permission mainly from the physical distribution information center to the empty trailer 2A. Reference numeral 15 denotes the computer at the physical distribution information center.

Now, the operation of the first embodiment of the invention will be described.

Figure 15:
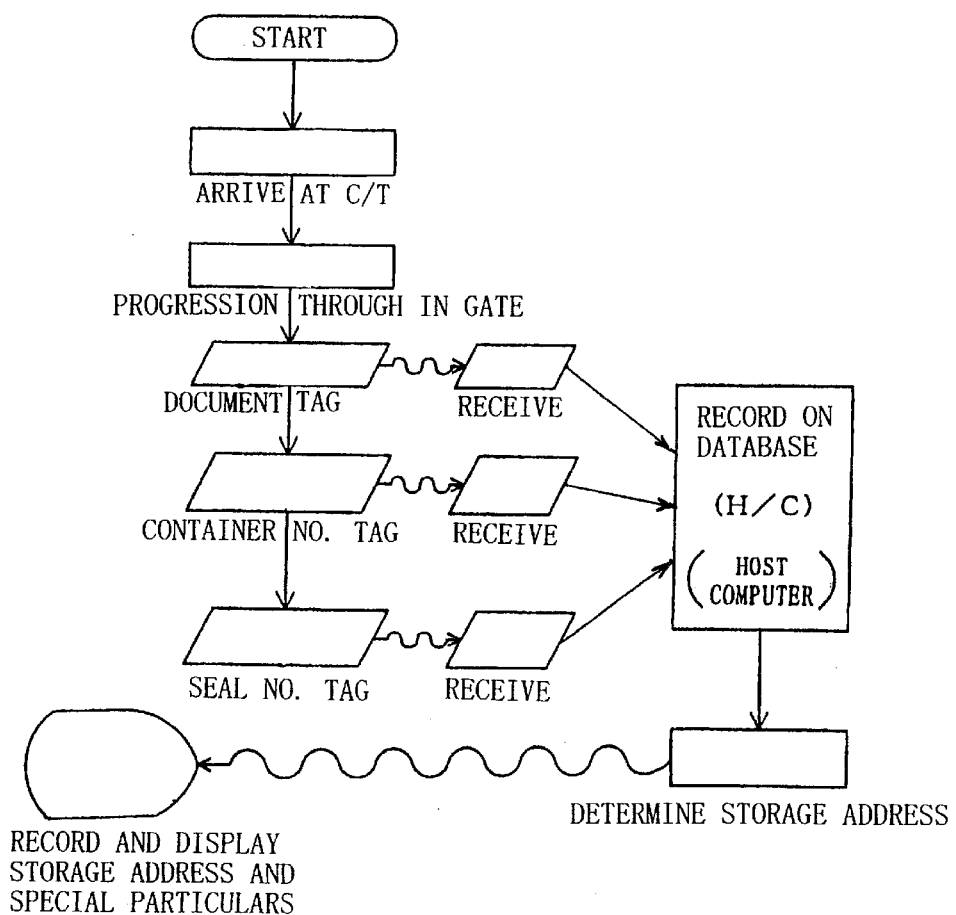
FIG. 15 is a flowchart of carry-in of a loaded container.

When a container is to be carried in for export, the cargoes are packed in the empty container 1A labeled with the radio IC number tag 10 sent from the shipping company and having the container number inputted. Upon completion of the packing, the closing doors 1b of the container 1 are closed and the radio IC seal tag 13, which is supplied from the shipping company and capable of sending the seal number only in the state of sealing, is attached for sealing, and then the container 1 is deposited on the trailer 2. The radio IC document tag 14 having the physical distribution information inputted is set to the trailer 2 so as to be conveyed to the entrance gate of the container terminal. At the entrance gate, as shown in FIGS. 13 and 15, the radio antenna 11 provided there receives the physical distribution information from the radio IC document tag 14 on the trailer 2 to send it to the computer 15 in the physical distribution information center. The radio antenna 11 also reads the container number from the radio IC number tag 10 applied on the container 1 and having the container number inputted as well as the seal number from the radio IC seal tag 13 having the seal number inputted, which information is sent to the computer 15 at the physical distribution information center where the computer 15 checks it up with the physical distribution information received from the shipping company and inputted beforehand and that from the radio IC document tag 14, etc., and confirms whether the container number and seal number are coincident with those of the physical distribution information of the radio IC document tag 14. On the other hand, the computer 15 makes data-processing to compute a storage address, and instructs it through the radio antenna 11 to the trailer 2. Here, when the computer 15 at the physical distribution center finds discrepancy upon checking of the information received, it instructs through the radio antenna 11 the trailer 2 to move to a turnout yard. In the turnout yard, an attendant gives instructions to the driver.

In a case of carry-out of a loaded container for import or of an empty container for export, as shown in FIG. 16A, the first radio antenna 11 receives the physical distribution information from the radio IC document tag 14A set on the empty trailer 2A at the entrance gate of the terminal and transmits it to the physical distribution information center where the computer checks it and computes a retrieving number and transmits through the third radio antenna 11B a signal instructing a retrieving address to the empty trailer 2A.

Figure 16B:
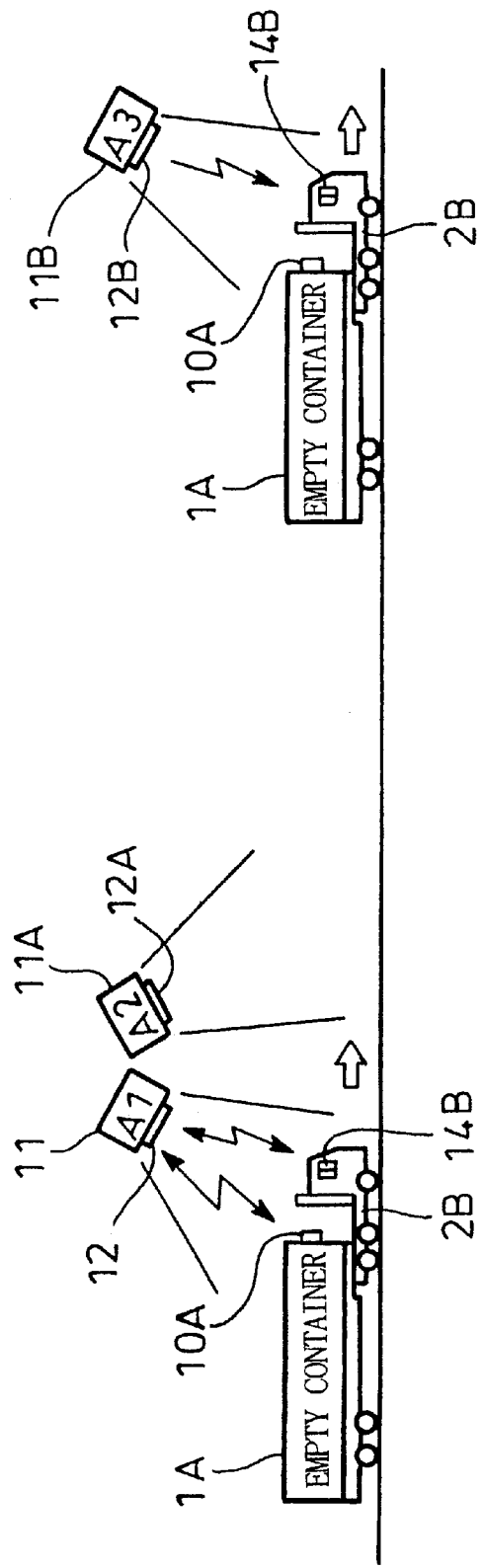
FIG. 16B is a conceptive view of carry-in of an empty container for storage.

Further, in a case of carry-in of an empty container 1A for storage, as shown in FIG. 16B, the empty container 1A is deposited on a trailer 2B; and the first radio antenna 11 at the terminal entrance gate receives the physical distribution information from a radio IC document tag 14B set to the trailer 2B and transmits it to the physical distribution information center. The first radio antenna 11 also reads the container number from a radio IC number tag 10A applied on the empty container 1A and having the container number inputted, and sends it to the physical distribution information center where the computer checks coincidence of the physical distribution information in relation to the container number and then transmits a signal instructing a storage address to the trailer 2B through the third radio antenna 11B.

Figure 18:
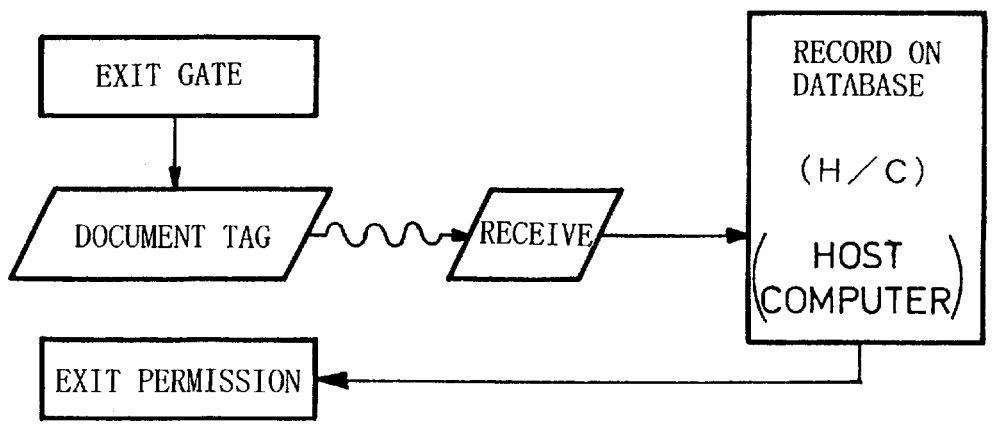
FIG. 18 is a flowchart when an empty trailer exits after it has transferred a loaded or empty container to a container yard.

On the other hand, in a case where an empty trailer which has transferred a loaded or empty container to the container yard is to exit through the exit of the container terminal, as shown in FIGS. 14 and 18, the radio antenna 11C receives the physical distribution information from the radio IC document tag 14A on the empty trailer 2A as the empty trailer 2A passes through the exit gate, and transmits the same to the physical distribution information center where the computer 15 checks it up with the physical distribution information received beforehand from the shipping company to confirm coincidence with the physical distribution information of the radio IC document tag 14A, and grants through the radio antenna 11E exit permission to the empty trailer 2A. Here, when the computer 15 at the information center checks the information received to find discrepancy, it directs through the radio antenna 11E the empty trailer 2A to move to the turnout yard. In the turnout yard, an attendant gives instructions to the driver.

Figure 17A:
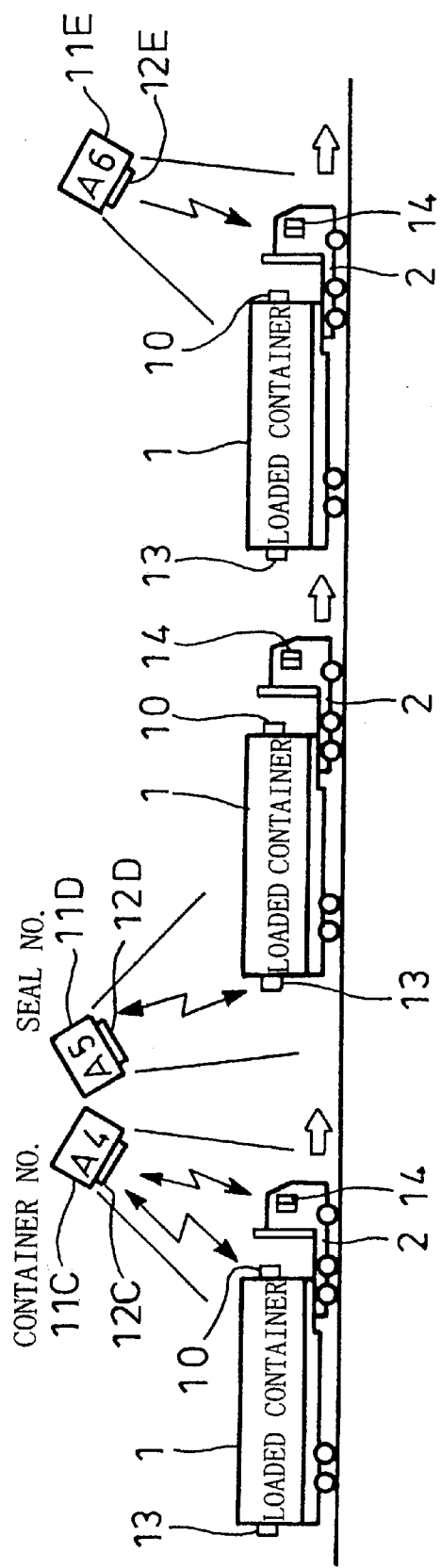
FIG. 17A is a conceptive view when a trailer exits for carry-out of a loaded container.
Figure 19A:
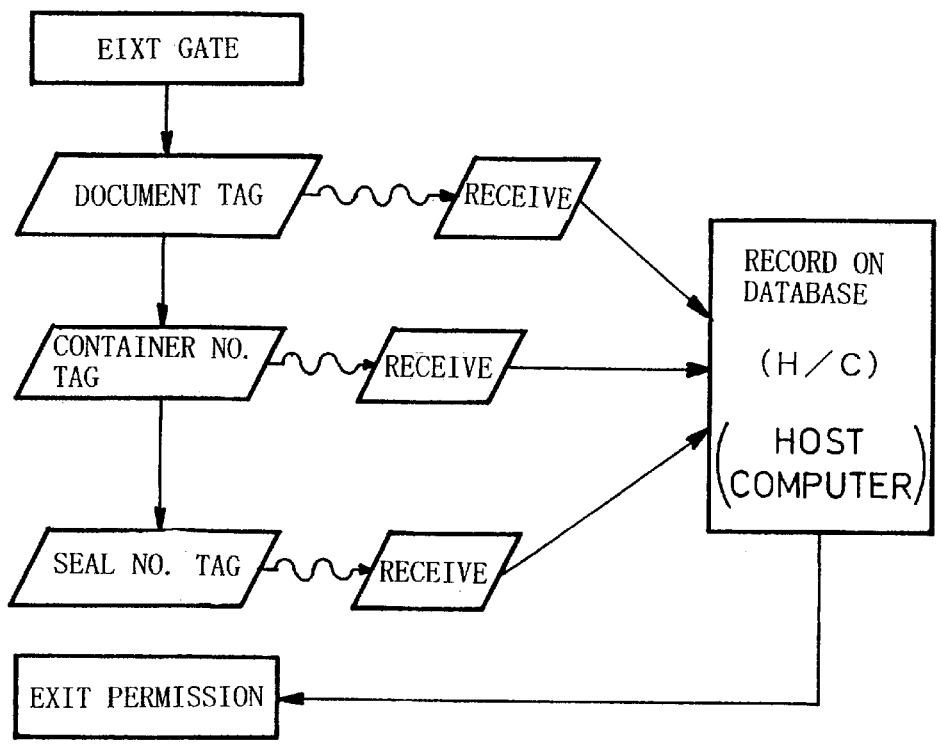
FIG. 19A is a flowchart of carry-out of a loaded container.

In a case of carry-out of a loaded container for import, as shown in FIGS. 17A and 19A, the first radio antenna 11C receives the physical distribution information from the radio IC document tag 14 set to the trailer 2 when the trailer 2 on which deposited is the loaded container 1 labeled with the radio IC number tag 10 and provided with the radio IC seal tag 13 to the closing doors, arrives the exit gate of the terminal, and transmits the physical distribution information to the computer in the physical distribution information center. The first radio antenna 11C also reads the container number from the radio IC number tag 10 applied on the container 1 and transmits the information to the computer at the physical distribution information center whereas the second radio antenna 11D reads the seal number from the radio IC seal tag 13 and transmits the information to the computer at the information center. Upon receipt of such information, the computer 15 checks it up with the physical distribution information received from the shipping company and inputted beforehand and that of the radio IC document tag 14, etc. to confirm whether the container number and seal number are coincident with those of the physical distribution information of the radio IC document tag 14. When the information coincides, the computer grants through the radio antenna 11E exit permission to the trailer 2; when the information has discrepancy, the computer directs through the radio antenna 11E the trailer 2 to move to the turnout yard.

Figure 17B:
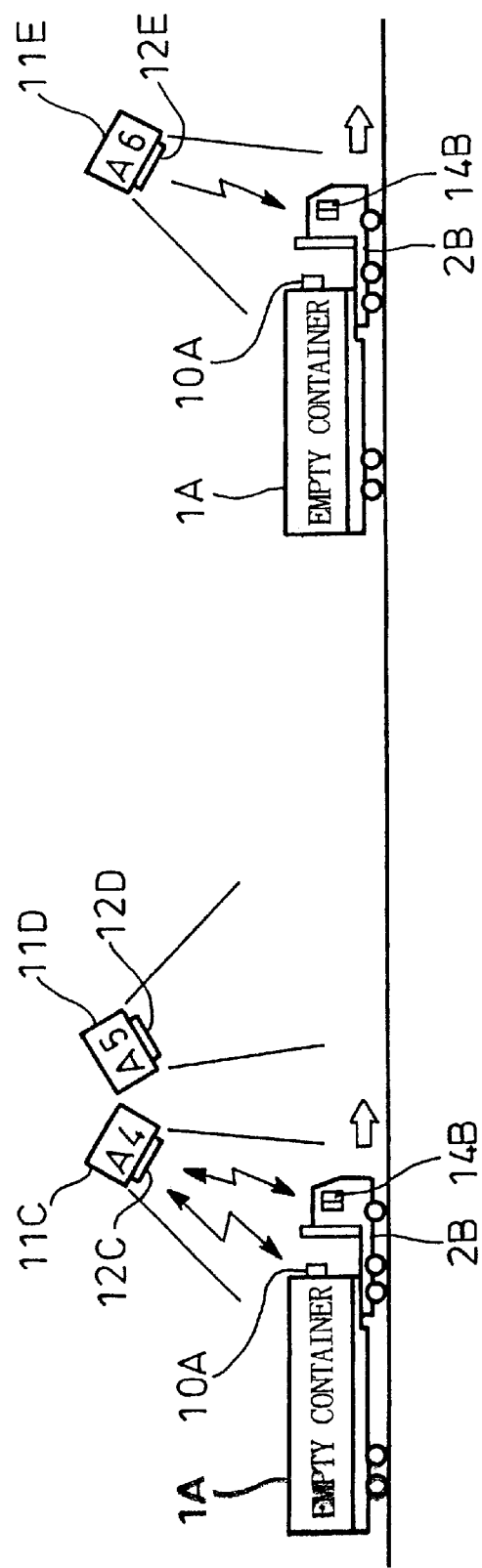
FIG. 17B is a conceptive view when a trailer exits for carry-out of an empty container.
Figure 19B:
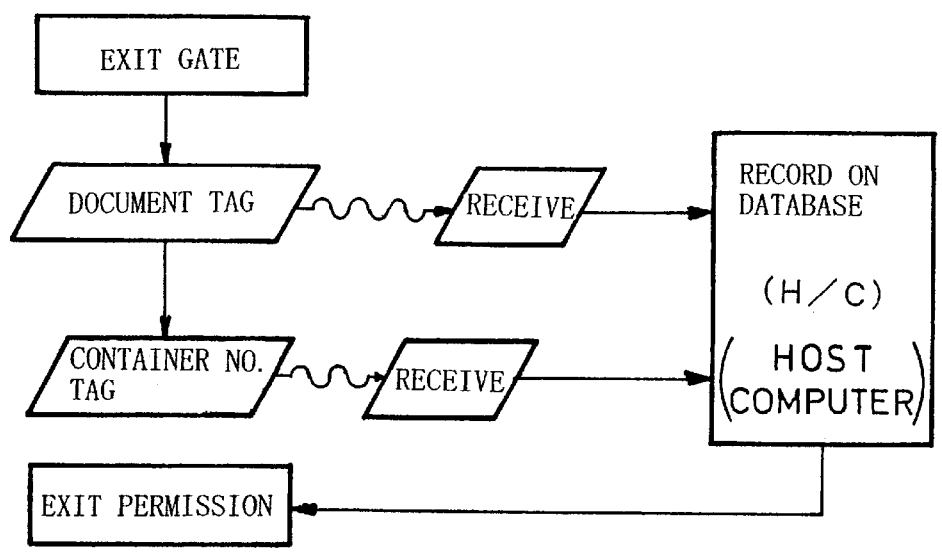
FIG. 19B is a flowchart of carry-out of an empty container.

Further, in a case where the empty container 1A is to be carried out, as shown in FIGS. 17B and 19B, as the trailer 2B, on which the empty container 1A labeled with the radio IC number tag 10A is deposited, arrives at the exit gate of the terminal, the first radio antenna 11C receives the physical distribution information from the radio IC document tag 14B set to the trailer 2B and sends it to the computer in the physical distribution information center. The first radio antenna 11C also reads the container number from the radio IC number tag 10A applied on the container 1 and transmits the information to the computer in the physical distribution information center which checks it up with the physical distribution information received from the shipping company and inputted beforehand and that of the radio IC document tag 14B, etc. to confirm whether the container number is coincident with that of the physical distribution information of the radio IC document tag 14B. When the information coincides, the computer grants through the radio antenna 11E exit permission to the trailer 2B; when the information has discrepancy, it directs through the radio antenna 11E the trailer 2B to move to the turnout yard.

As has been discussed, according to the first embodiment of the invention, the procedure at the entrance gate of the terminal including jobs such as checking and confirmation of the physical distribution information, reading and confirmation of the container number, confirmation of sealing by the seal tag, reading and confirmation of the seal number, and the procedure at the exit gate of the terminal including jobs such as checking and confirmation of the physical distribution information, reading and confirmation of the container number, confirmation of the sealing by the seal tag, reading and confirmation of the seal number are performed by radio-controlled jobs, thereby making it possible to automate the procedures. Consequently, manual input jobs are omitted, and therefore, not only can a possibility of an input error by manual input be eliminated, but also the driver can pass through the entrance and exit gates without stopping there, thereby making it possible to improve transfer efficiency of a container.

It should be appreciated that the first embodiment of the invention is not limited to that has been discussed above and may be changed in various manners without departing from the scope of the invention. Also, the radio IC tag is not limited to that illustrated above and may be of any format. Further, in the present embodiment description has been made on a case where arranged at the terminal gates are the radio antennas which receive and transmit in relation to the radio IC number tag applied on the container, the radio IC seal tag attached to the closing doors of the container and the radio IC document tag set to the trailer. However, the location of the radio antennas is not limited at the gates, and the radio antennas may be provided at any other place within the container yard, for example, at the container crane or yard crane, to make confirmation there. Also, description has been made on a case where the first, second and third radio antennas are provided; however, the number and locations of the radio antennas are not limited thereto.

Figure 20A:
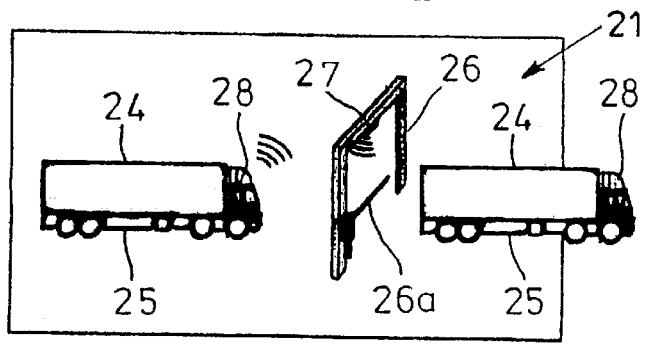
FIGS. 20A through 20C are conceptive views of an apparatus for managing carry-out and -in of a container at the container terminal, FIG. 20A being a conceptive view of a gate of the container terminal, FIG. 20B being a conceptive view of a container yard in the container terminal, FIG. 20C being a conceptive view of a port physical distribution information center.
Figure 20B:
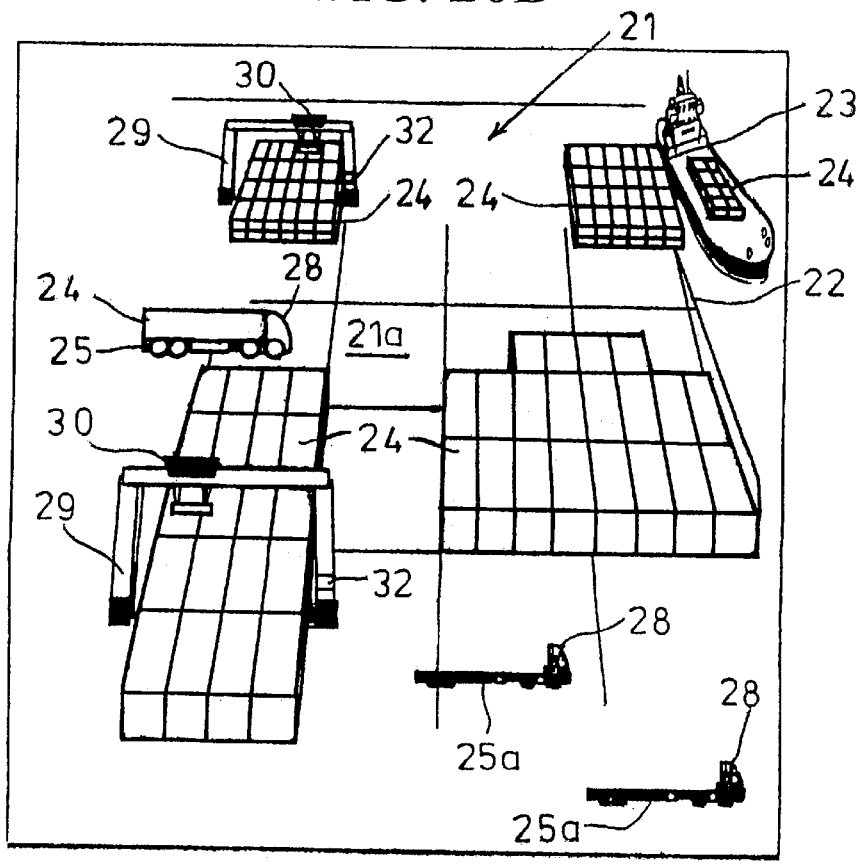
Figure 20C:
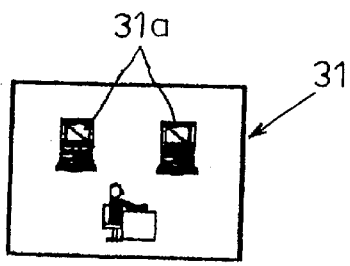
Figure 21:
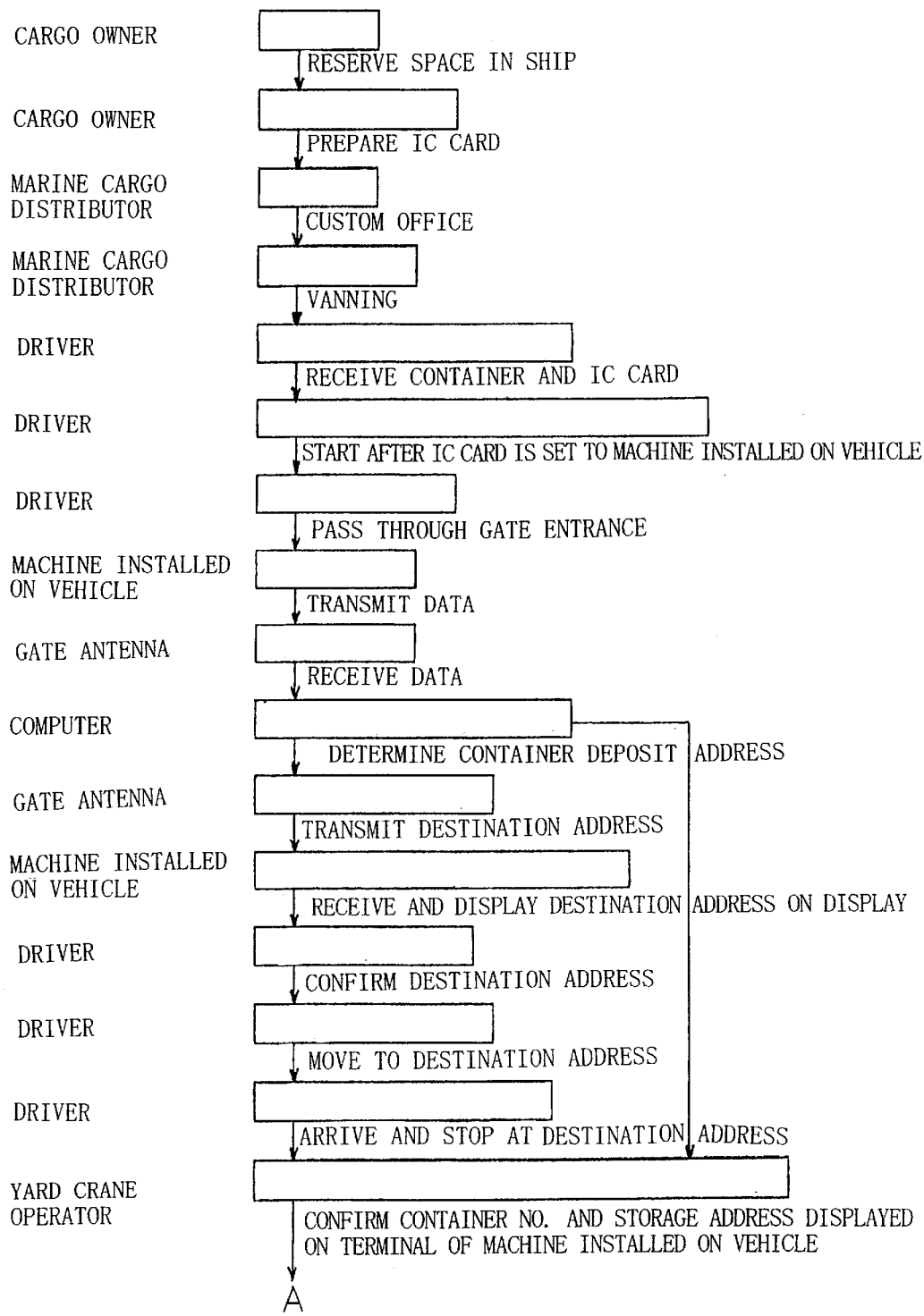
FIGS. 21 and 22 show a flowchart showing a summary of the management of carry-in (export) of a container at the container terminal, which is divided in two along a direction of the flow (FIGS. 21 and 22 show the upstream and downstream sides, respectively) with A being a connection.
Figure 22:
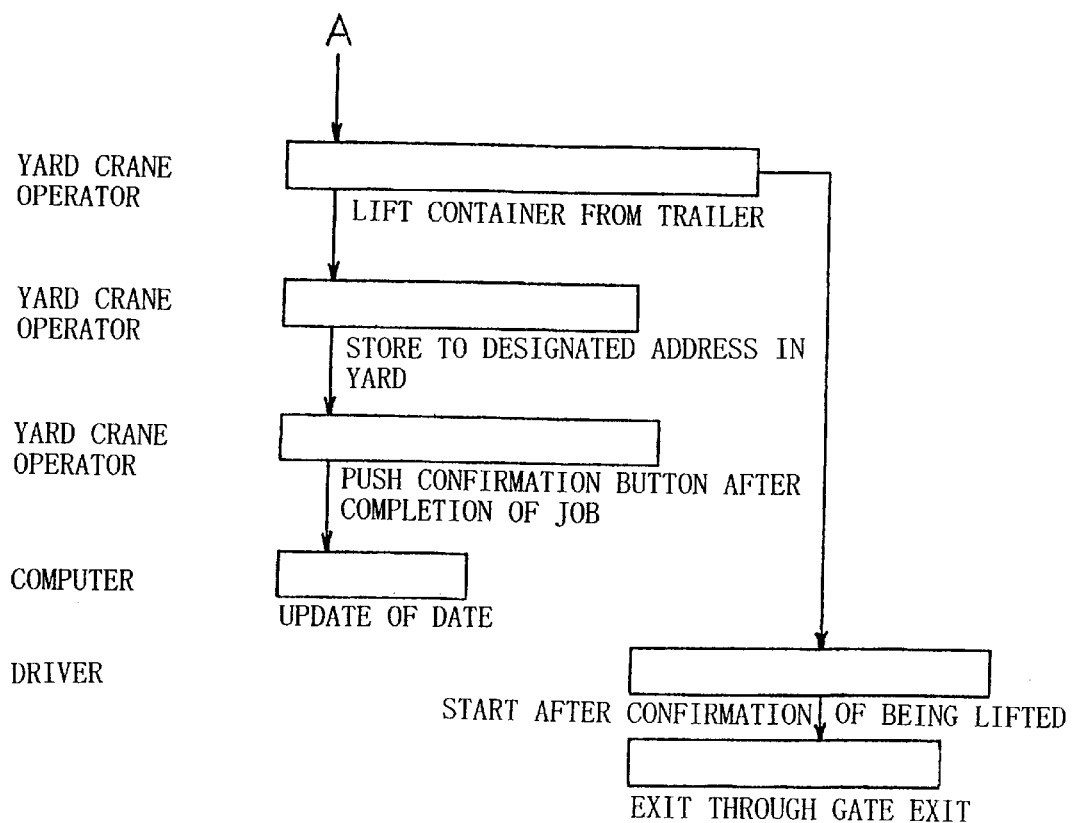

FIGS. 20 through 22 are views showing a second embodiment of the invention to achieve managing apparatus and method of carry-in and -out of a container at the container terminal.

In FIG. 20, reference numeral 21 denotes a container terminal constructed along a quay 22. Reference numeral 21a denotes a container yard of the container terminal 21. Reference numerals 23 and 24 denote a container ship and a container, respectively. The container 24 is stored in the container yard 21a upon export or import. Reference numeral 25 designates a trailer having the container 24 deposited thereon; and 25a, an empty trailer. Reference numerals 26 denotes a gate of the container terminal 21; and 26a, a crossing gate. Reference numeral 27 denotes a terminal on the gate 26. Reference numeral 28 denotes a terminal installed on a trailer 25 and to which an IC card (not shown) is set. Reference numeral 29 designates a yard crane at the container yard 21a which has a trolley 30 for lifting up and down the container 24 and a terminal 32 installed thereon. Reference numeral 31 denotes port physical distribution information center; and 31a, a computer provided in the port physical distribution information center 31.

The terminal 28 on the trailer, to which an IC card having physical distribution information of the container 24 inputted is set, receives and transmits the physical distribution information. The physical distribution information such as the shipping company, the name of the ship and the container number is inputted to the IC card by a card writer (not shown).

The terminal 27 on the gate mediates transmission and reception of the physical distribution information between the terminal 28 on the trailer and the port physical distribution information center 31.

The terminal 32 on the yard crane receives and transmits container storage information of the container yard 21a in relation to the physical distribution information center 31.

In the physical distribution information center 31, the computer 31a performs data processing based on the physical distribution information and container storage information respectively from the terminals 27 and 32 on the gate and the yard crane to transmit the physical distribution information and container storage information respectively to the terminals 27 and 32 on the gate and the yard crane, while updating the data of the container storage information by a signal from the terminal 32 on the yard crane.

FIGS. 21 and 22 show a flowchart showing a summary of the management of carry-in (export) of a container in the container terminal, which is divided in two along a direction of the flow (FIGS. 21 and 22 show the upstream and downstream sides, respectively) with A being a connection.

In the case of exporting the cargoes, as shown in FIGS. 21 and 22, the owner initially makes a reservation for a ship, and prepares an IC card into which the physical distribution information such as the shipping company, the name of the ship and the container number, are entered, and then requests a marine cargo distributor to transport a container. The distributor performs a procedure for export at a custom office, and packs the cargoes into the container after the procedure for export is completed, and passes the IC card to a driver of a trailer. The driver deposits the container on the trailer and sets the IC card to the terminal on the trailer and moves to the gate of the container terminal. When the trailer arrives at the gate, the physical distribution information of the container is transmitted from the terminal on the trailer to the terminal on the gate. The physical distribution information from the terminal on the trailer is sent through the terminal on the gate to the port physical distribution information center in the container terminal where the information is subjected to data processing so that a container destination address (container delivery spot) with the yard crane is displayed on the screen of the terminal on the trailer through the terminal on the gate while the identification information of the trailer or container, and instructions as to the delivery spot of the container with the trailer and the container storage spot are instructed to the terminal on the yard crane. The driver of the trailer confirms the delivery spot of the container on the screen of the terminal on the trailer, and moves to and stops at the designated spot. The operator of the yard crane confirms the identification information of the trailer or container and the delivery spot of the container on the screen of the terminal on the yard crane, and moves the yard crane to the delivery spot of the container and stops there, whereby the container is lifted up by the yard crane to be moved and put down at the instructed storage address in the container yard for storage. When the container has been stored, the operator of the yard crane transmits information reporting that the container has been stored to the port physical distribution information center. The information center updates the data of the container storage information based on the information from the terminal on the yard crane.

On the other hand, in a case of importing the cargoes, the owner prepares an IC card into which physical distribution information such as the shipping company, the name of the ship and the container number are entered in the same manner as the IC card prepared in the case of export, and then requests the marine cargo distributor to transport the container. The distributor effects the procedure for import at the custom office, and pass the IC card to the driver of the trailer when the procedure for import is completed. The driver sets the IC card to the terminal on the empty trailer, and moves to the gate of the container terminal. When the empty trailer arrives at the gate, the physical distribution information of the container is transmitted from the terminal on the trailer to the terminal on the gate; and thereafter, the container is deposited on the empty trailer from the storage address in the container yard by a way substantially opposite to the way in the case of exporting the cargoes. The operator of the yard crane transmits information reporting that the withdrawal has been completed, so that the port physical distribution information center updates the data of the container storage information. Upon confirmation that the container is deposited on the trailer by the yard crane, the trailer starts off and exits through the gate of the container terminal.

An operation of the second embodiment of the invention will be described.

In a case of carry-in or -out of the container 24, the IC card with the physical distribution information inputted is prepared to be set to the terminal 28 on the trailer and conveyed to the gate 26 of the container terminal 21. When the trailer 25 passes through the gate 26, the physical distribution information of the IC card is transmitted from the terminal 28 on the trailer through the terminal 27 on the gate to the physical distribution information center 31 where the physical distribution information is subjected to data processing and the delivery spot of the container 24 with the yard crane 29 is instructed to the trailer 25 through the terminal 27 on the gate, while the identification information of the trailer 25 or container 24, the delivery spot of the container 24 with the trailer 25 and the container storage spot are instructed to the terminal 32 on the yard crane. When the container 24 has been stored or withdrawn, the terminal 32 on the yard crane transmits information thereof to the physical distribution information center 31, so that the information center 31 updates the data of the container storage information.

As has been discussed, according to the second embodiment of the invention, carry-out and -in of a container are managed by transmission and reception of the physical distribution information for carry-out and -in of a container between the terminals on the trailer, gate and yard crane and the physical distribution information center in the container terminal. Consequently, the procedures for carry-out and -in of containers with the containerized cargo carry-in vouchers at the gate of the container terminal can be omitted, thereby making it possible to improve transfer efficiency of the container.

It should be appreciated that the present embodiment is not limited to the form as has been described above and may be changed in various manners without departing from the scope of the invention.

FIGS. 23 through 34 show a third embodiment of the invention to achieve container managing apparatus and method in the container yard.

In FIGS. 23 through 34, reference numeral 41 denotes a container (either a loaded or empty container); and 47, a container number tag applied on the container and incorporating a radio IC. Reference numeral 42 denotes a tire type transfer crane as an example of the yard cargo handling machine (hereinafter, referred to as yard crane), which is of the gantry type having a traverse trolley 43 on a girder. Reference numeral 43a denotes an operating cab attached to the trolley 43. The operating cab 43a is provided with a radio antenna 49.

Reference numeral 44a denotes a trailer which carries in or out the container 41 from and to outside. Reference numeral 45 denotes a document tag attached to the operating cab of the tractor head of the trailer 44a and incorporating a radio IC into which information such as the number of the container 41 to be received and the contents of the container 41 has been inputted.

Now, description will be made on the radio antenna 49 and container number tag 47. The radio antenna 49 may incorporate, for example, the reader 12 as shown in FIG. 9A on the first embodiment which has the coil 12a to transmit radio waves. The container number tag 47 may include, for example, the radio IC 10a and coil 10b as shown in FIG. 9B on the first embodiment. Upon receipt of radio waves from the radio antenna 49, the container number tag 47 transmits the container number information which is received by the radio antenna 49 to read the container number. The structure of the document tag 45 is the same as that of the container number tag 47 and the explanation is omitted.

Figure 23A:
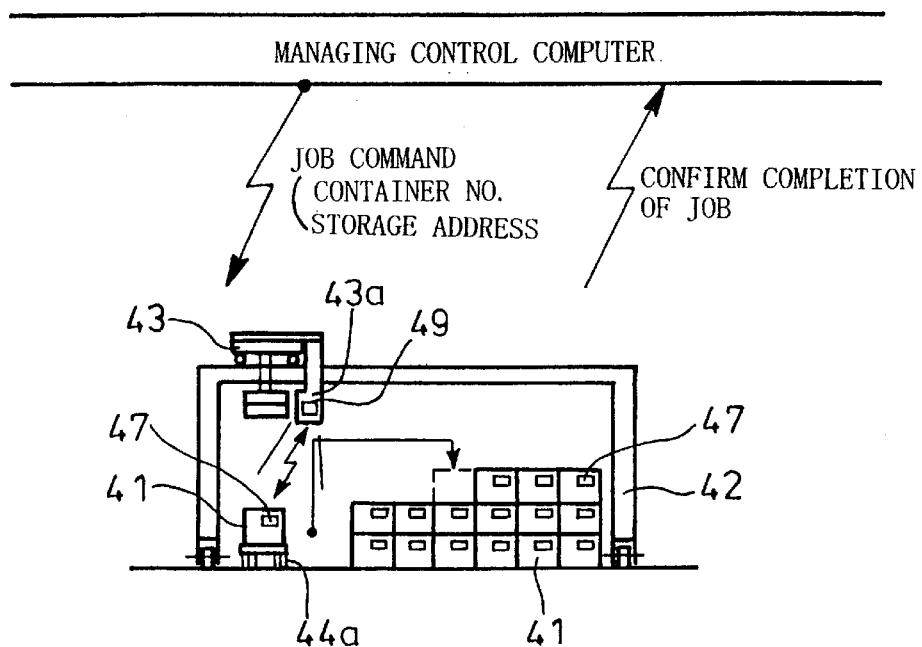
FIGS. 23A and 23B are front views showing states when a container is loaded and unloaded in the container yard by a yard cargo handling machine (yard crane), FIG. 23A showing a state when a container carried in from outside by a trailer is loaded, FIG. 23B showing a state when a container stored in the container yard is unloaded to an empty trailer to be carried out to outside.
Figure 24:
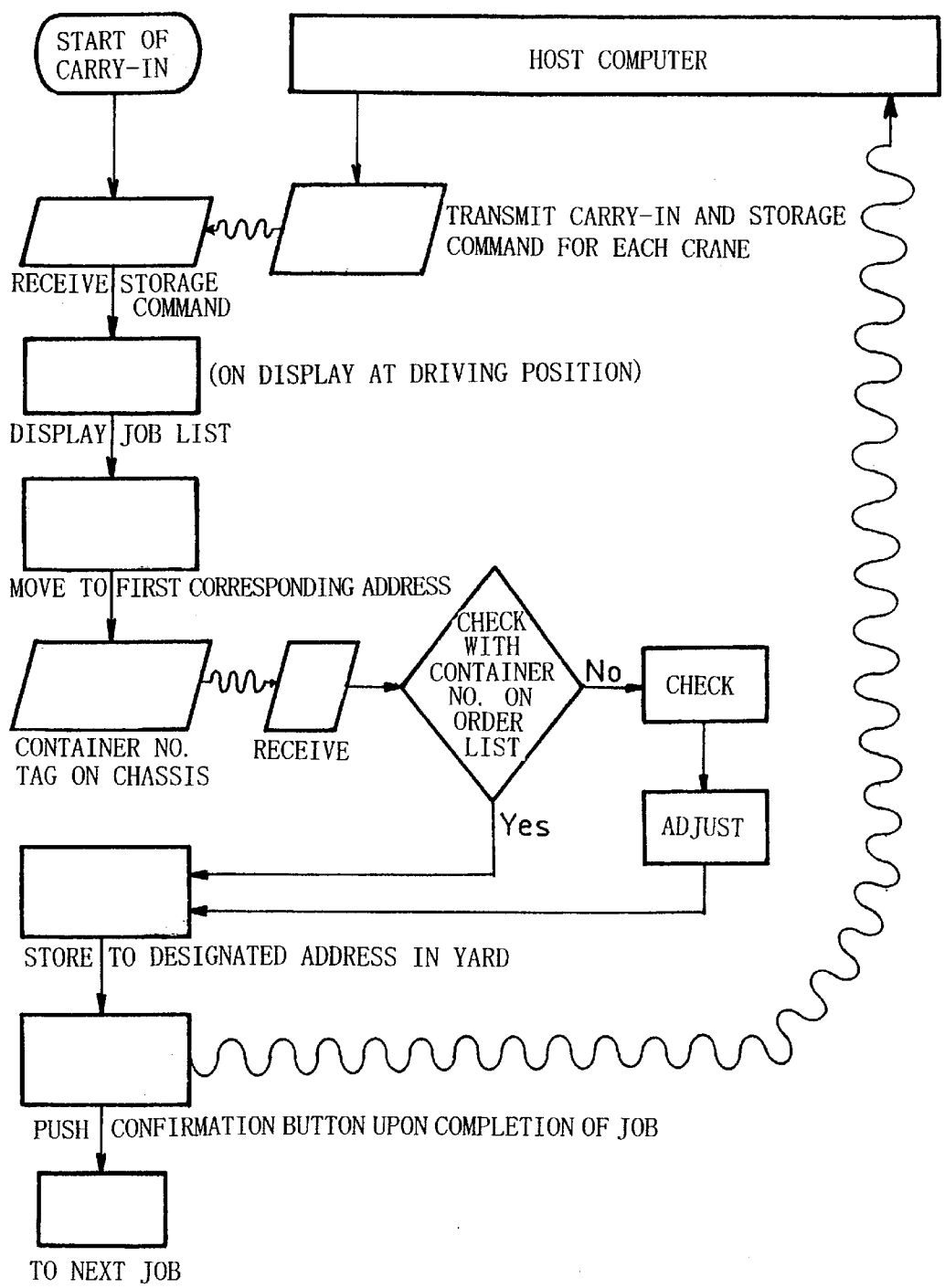
FIG. 24 is a flow sheet showing a flow when a container carried in from outside is stored.

Next, description will be made, with reference to FIGS. 23A and 24, on the method of managing carry-in of containers when a container is carried in from outside through the gate and stored in stacks in the container yard. A storage cargo handling job procedure is inputted into the host computer (operational control computer) at the physical distribution information center in the container terminal. The host computer generates a job procedure for each yard crane and transmits the same to a small-scale computer at the operating cab 43a of the yard crane 42. A display device at the front of the driving position in the operating cab 43a displays the information as a job order list. The yard crane 42 moves to the corresponding address. Since the display device displays the job order, the storage is started in accordance therewith. When the container number tag 47 on the trailer 44a transmits the container number information which is received by the radio antenna 49. The container number displayed in the job order list is checked up with the container number information from the radio antenna 49, and in a case where the information coincides, the operator manipulates the yard crane 42 to lift up the container 41 from the trailer 44a and put it down at the instructed address within the container yard in accordance with the job order list. When deposition of the container 41 is completed, the operator transmits information thereof to the host computer, and stores the next container 41 in the job order list in the same manner.

Figure 23B:
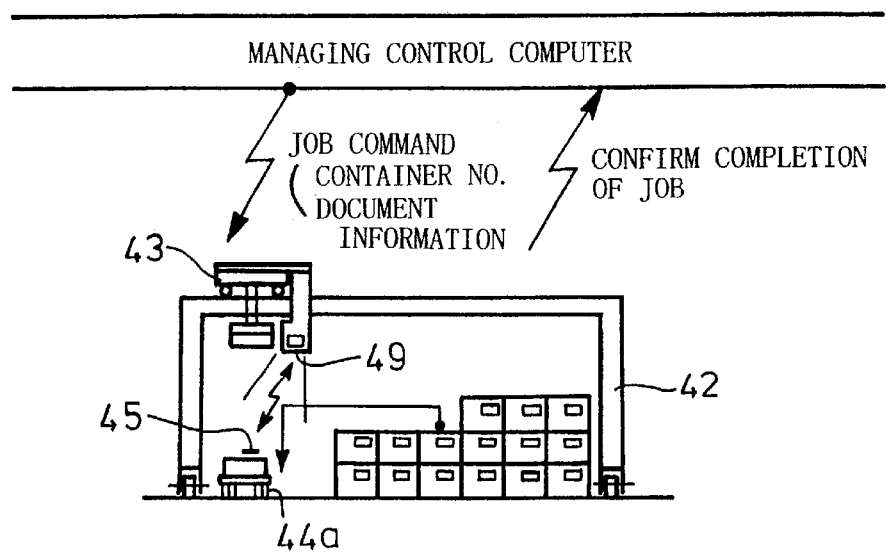
Figure 25:
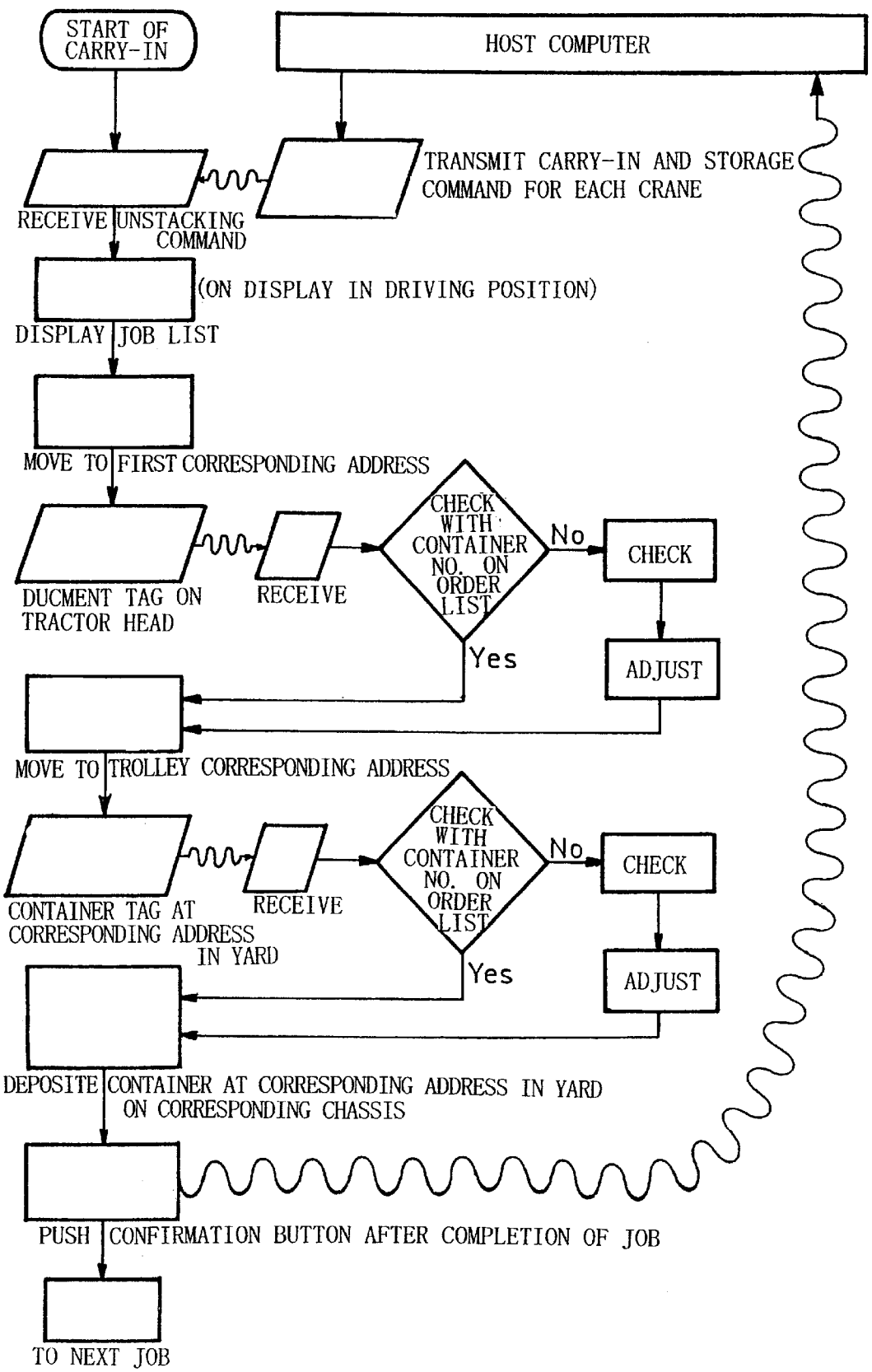
FIG. 25 is a flow sheet showing a flow when a stored container is carried out to outside.
Figure 34A:
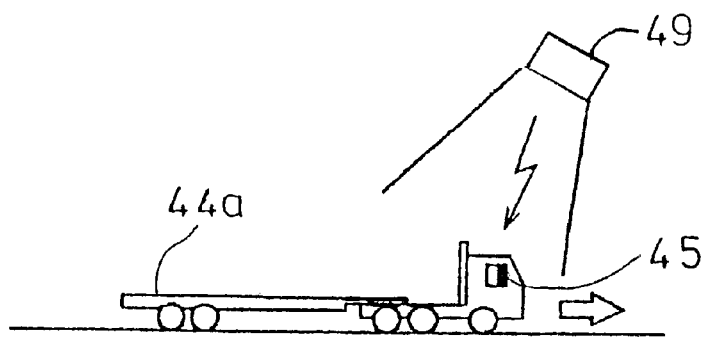
FIG. 34A is a perspective view showing relationship between a document tag and a radio antenna.

Next, description will be made, with reference to FIGS. 23B, 25 and 34A, on the method of managing carry-out of a container when the container is to be carried out from the container yard to outside. The procedure up to where the job order list is displayed on the display device in the operating cab 43a is the same as that in the carry-in case discussed above, and the explanation is omitted to start the description at the beginning of carry-out.

In accordance with the job list, the operator moves the yard crane to a position where the trailer 44a is waiting. The operator obtains the information of the container number which the trailer 44a is to receive from the document tag 45 attached to the tractor head of the trailer 44a through the radio antenna 49, and checks it up with the job order list discussed above. Upon confirmation of coincidence, the operator moves the trolley 43 to the corresponding address.

The radio antenna 49 receives radio waves from the container number tag 47 applied on the container 41 stored at the address before the container 41 is lifted up by the trolley 43 to confirm that the container is in the order of the job order list. Upon confirmation, the container 41 is lifted up; and the trolley 43 is moved to the trailer 44a to deposit the container 41 on the trailer 44a. When the job of depositing is completed, the operator of the yard crane presses a job complete button to input information into the host computer.

Figure 26A:
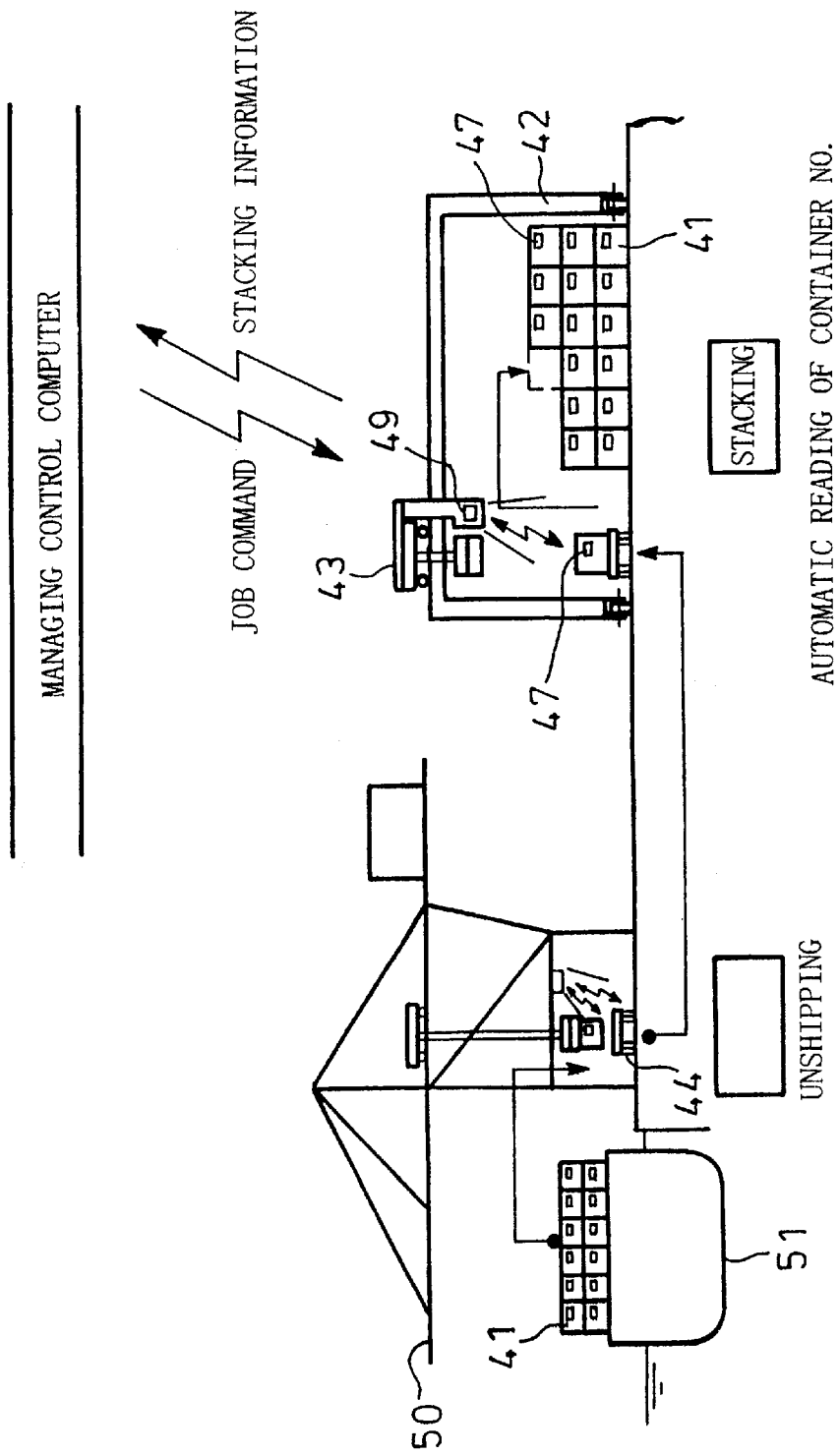
FIG. 26A is a front view showing unshipping of a container for stacking.
Figure 27:
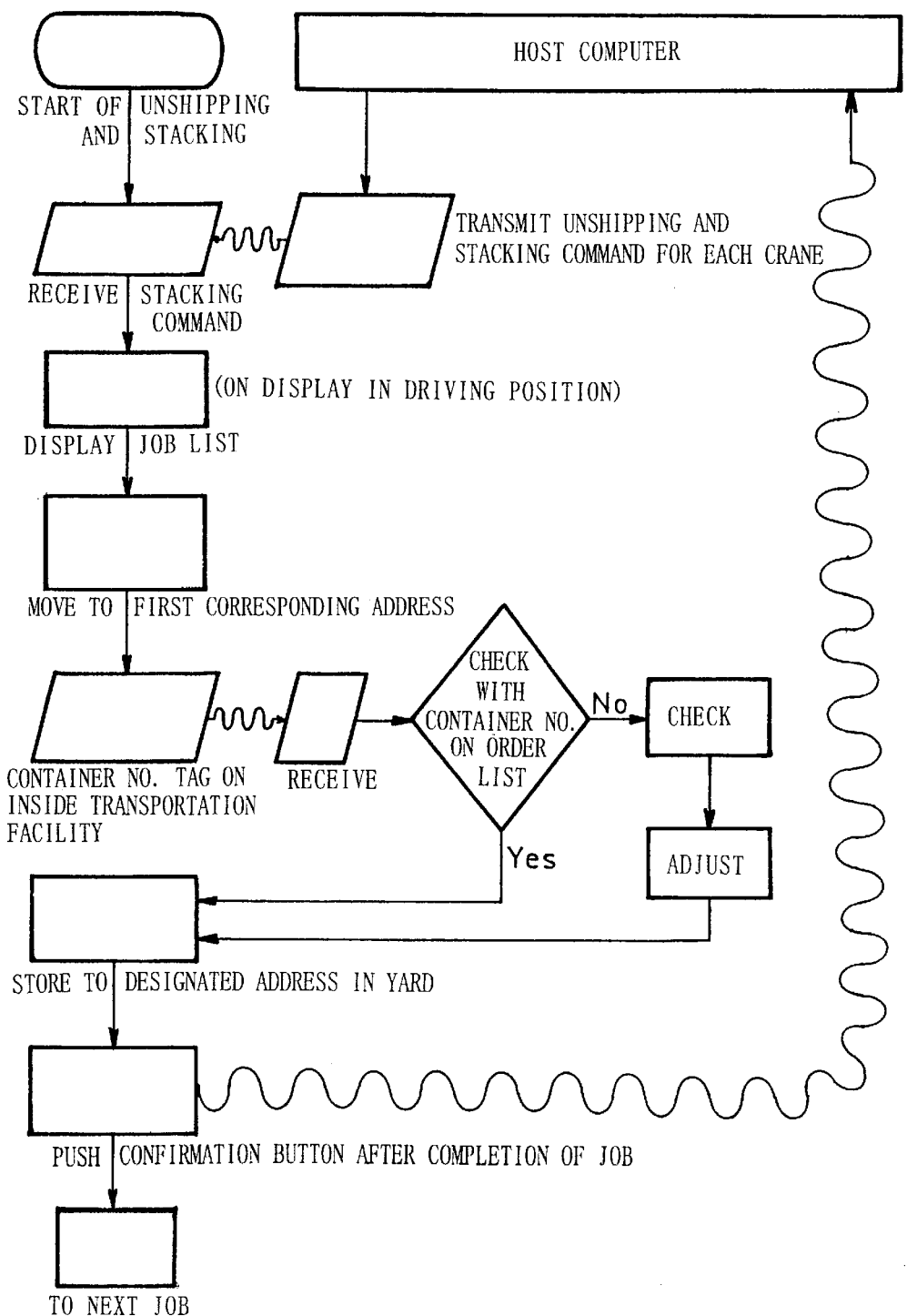
FIG. 27 is a flow sheet showing a flow when an unshipped container is stacked (stacked up)

Next, description will be made, with reference to FIGS. 26A and 27, on the management method of stacking (stack-up) of an unshipped container. The container 41 is unshipped from a container ship 51 by a container crane 50, deposited on an inside transportation carriage 44 and conveyed to under the yard crane 42. The jobs thereafter are substantially the same as those explained in the case of storing the container carried in from outside as above, and the explanation is omitted.

Figure 28:
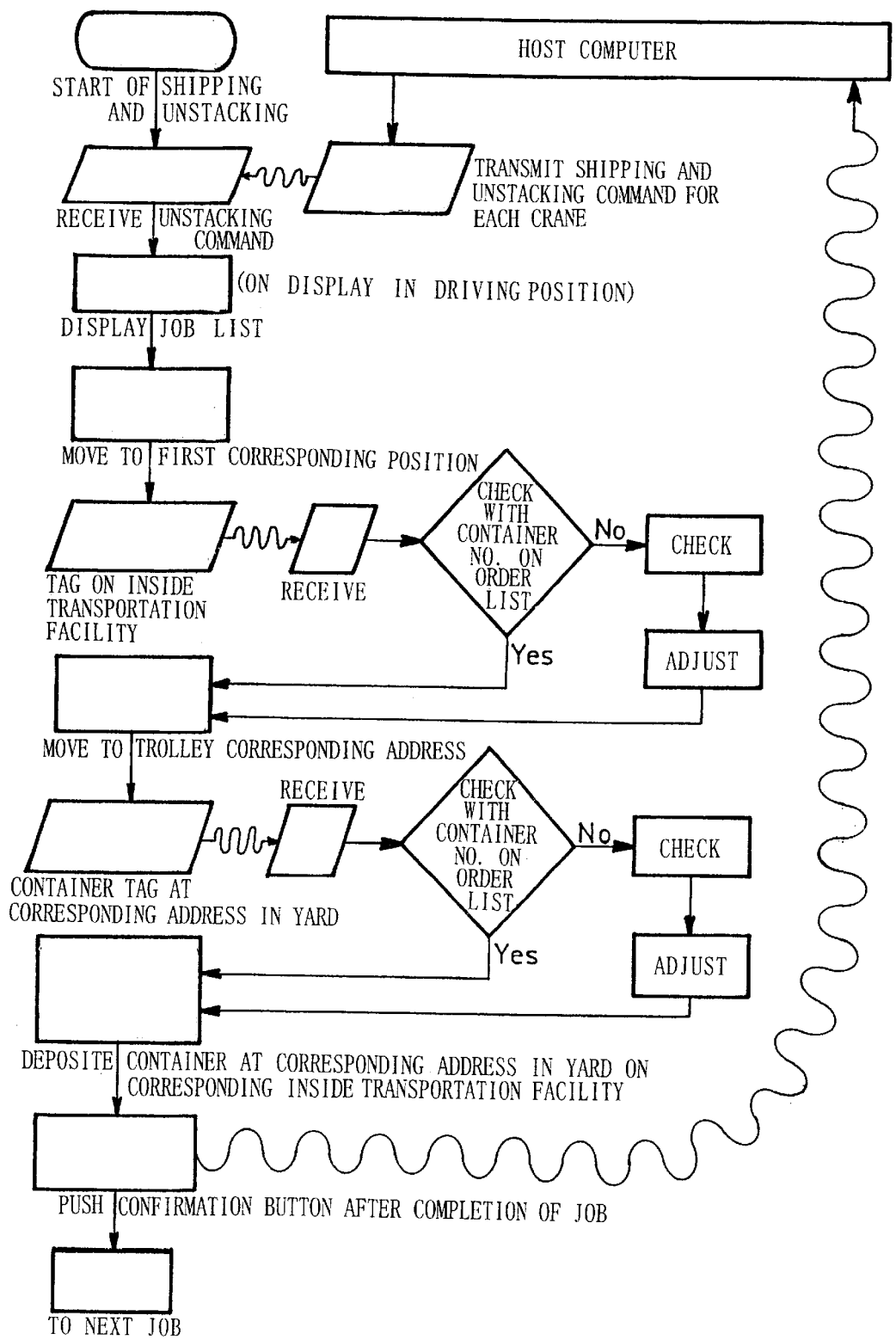
FIG. 28 is a flow sheet showing a flow when a container is unstacked for shipping.
Figure 34B:
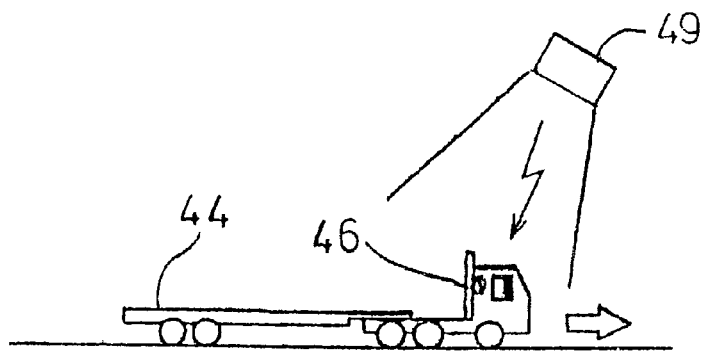
FIG. 34B is a perspective view showing relationship between a carriage number tag and a radio antenna.

Next, description will be made, with reference to FIGS. 26B and 28, on the method of managing unstacking of a container for shipping. This method is substantially the same as the method of carry-out of the container to outside discussed above. In the case of carry-out to outside, the trailer 44a is used; but in the case of shipping, the inside transportation carriage 44 is used and a carriage number tag 46 (as shown in FIG. 34B) is employed instead of the document tag 45 used in the case of carry-out to outside.

Figure 29A:
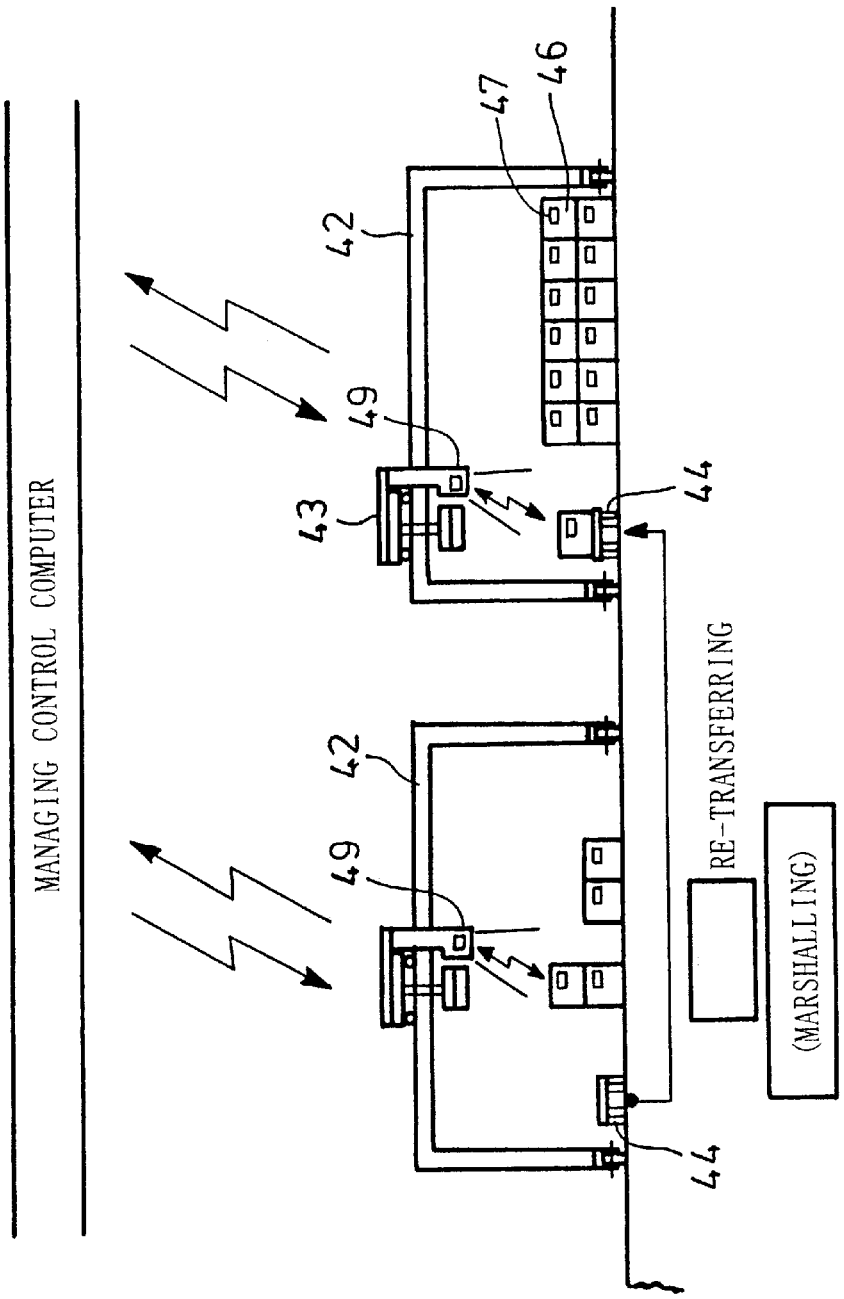
FIG. 29A is a front view showing re-transferring of a container.
Figure 30B:
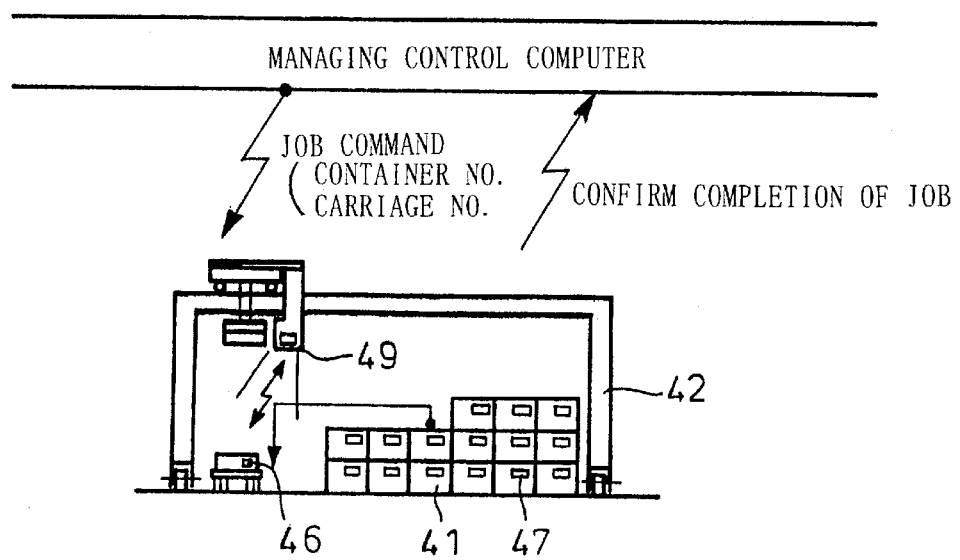
FIG. 30B is a front view when a container is carried out for shipping or re-transferring.
Figure 31:
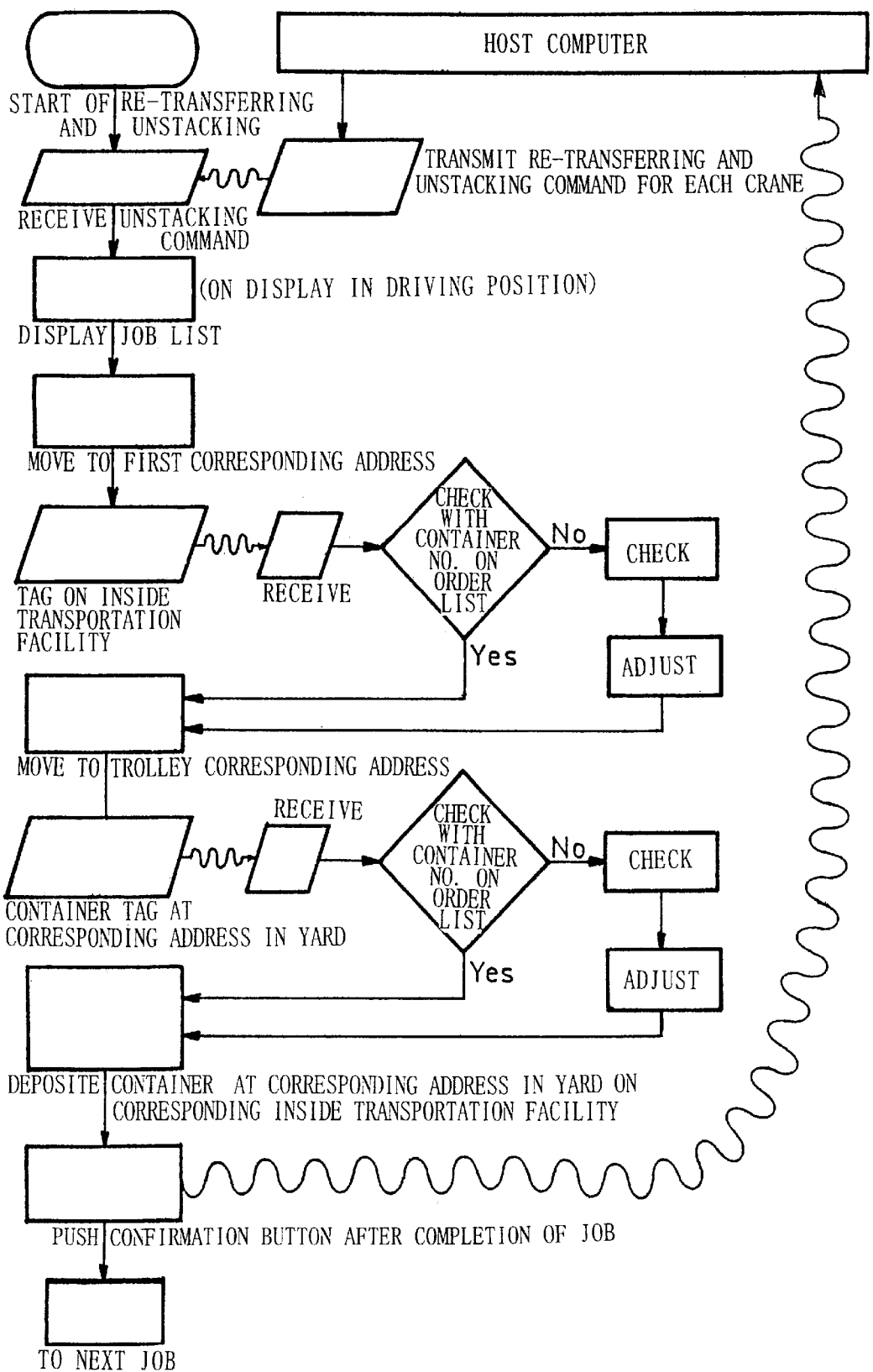
FIG. 31 is a flow sheet showing a flow of unstacking for re-transferring.

Next, description will be made on the method of managing re-transferring (marshalling) in the container yard. The marshalling is defined as an act of re-transferring a container stored in stages within the container yard to an other place within the container yard for convenience of shipping or carry-out. The method of managing the unstacking for re-transferring is shown in FIGS. 29A, 30B and 31. This method is substantially the same as the method of managing the stacking for shipping discussed above.

Figure 30A:
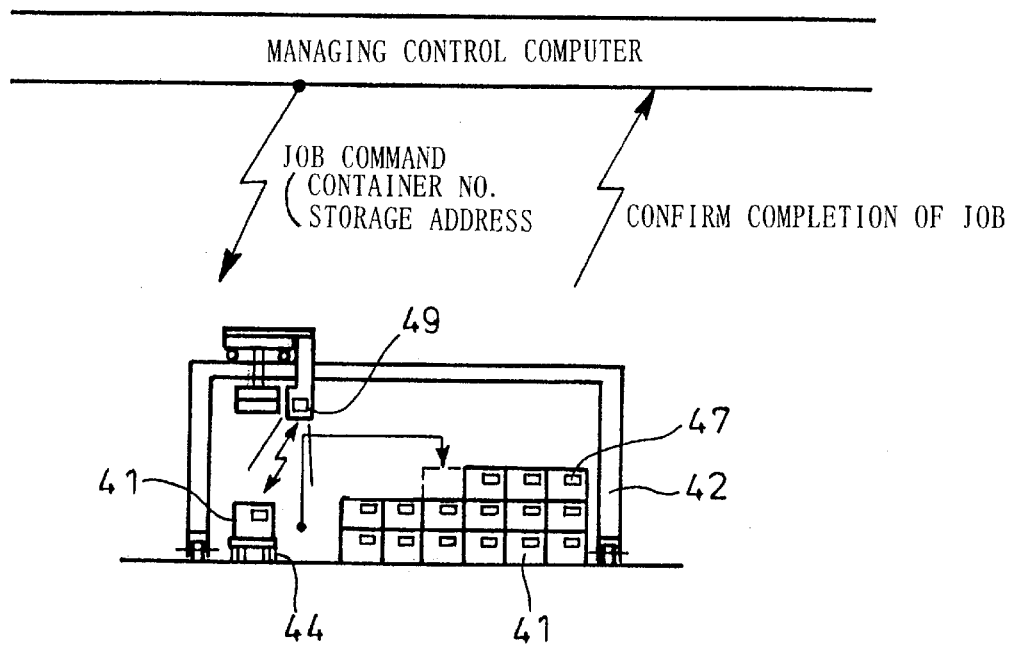
FIG. 30A is a front view when a container unshipped or carried in for re-transferring is stored.
Figure 32:
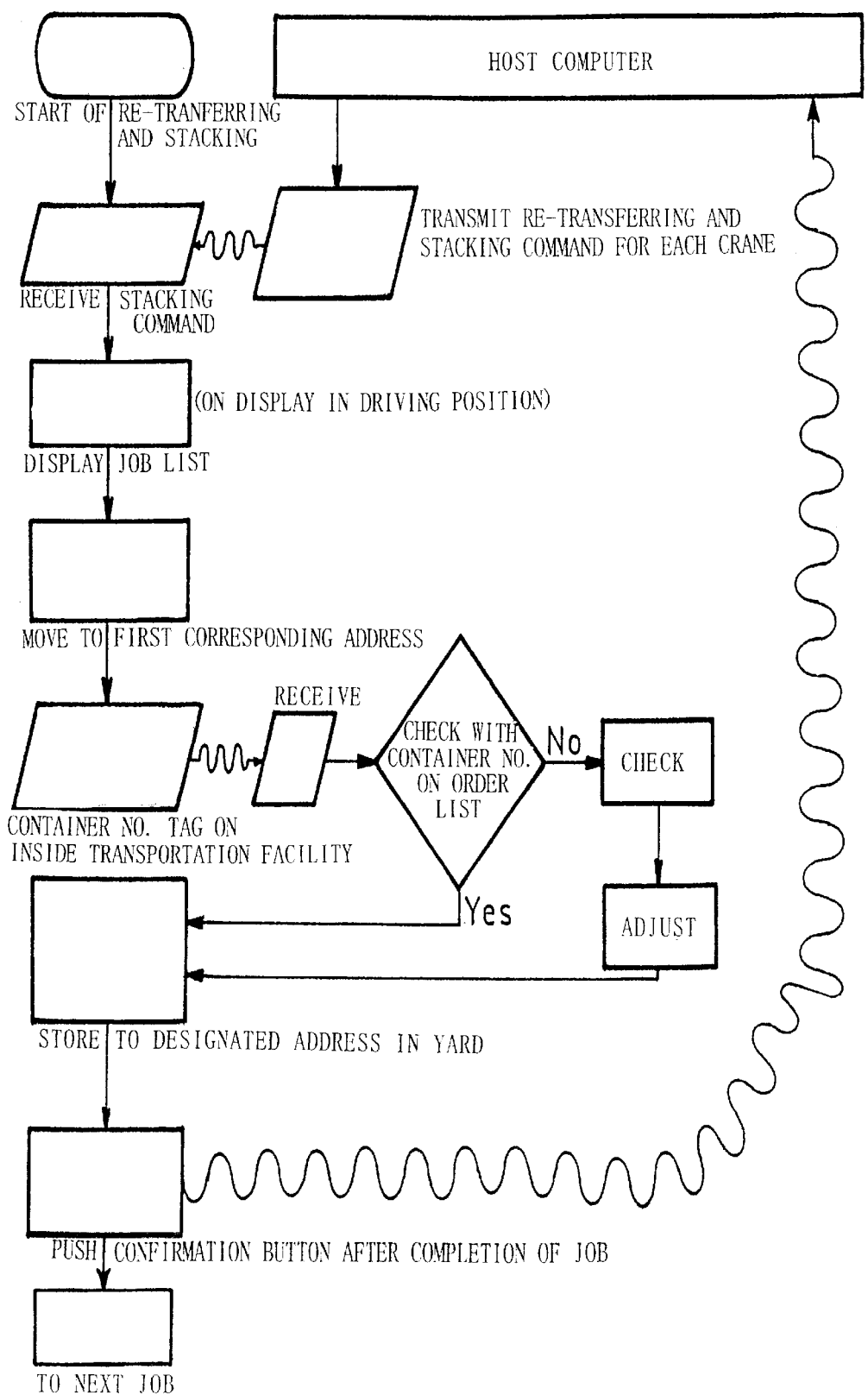
FIG. 32 is a flow sheet showing a flow of stacking for re-transferring.

Next, the method of managing stacking for re-transferring in the container yard is shown in FIGS. 29A, 30A and 32. This method is substantially the same as the method of managing the stacking after the unshipping discussed above.

Figure 29B:
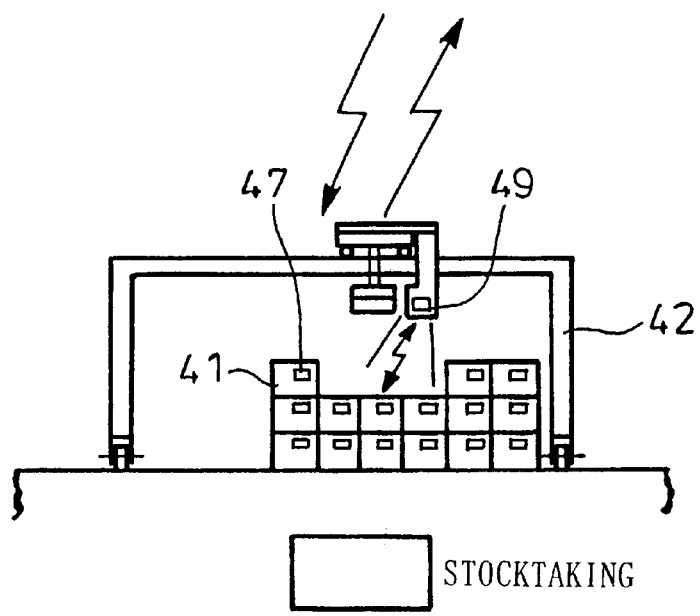
FIG. 29B is a front view showing stocktaking of containers.
Figure 33:
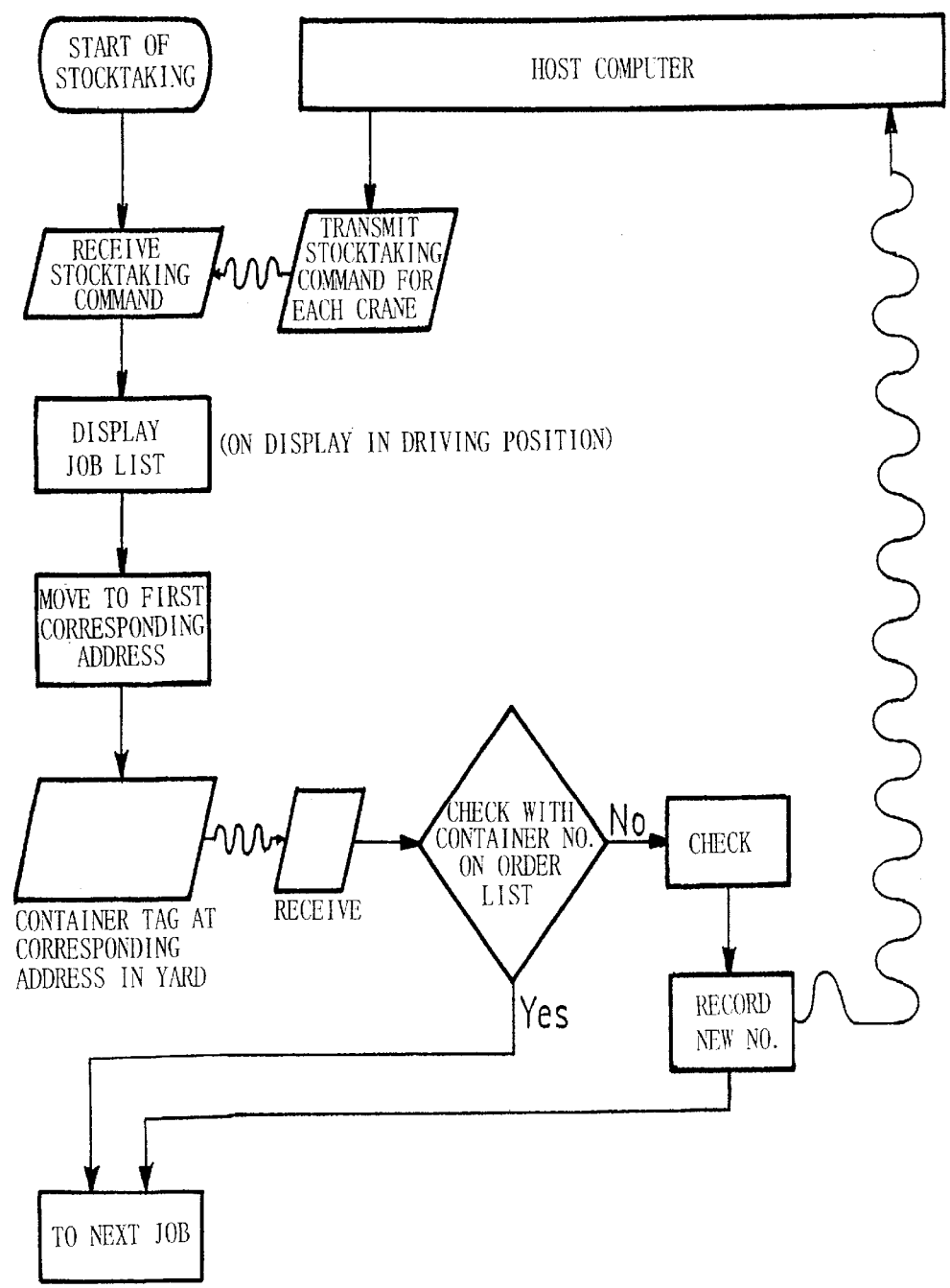
FIG. 33 is a flow sheet showing a flow of stocktaking.

Next, description will be made on the method of stocktaking of stored containers in stacks with reference to FIGS. 29B and 33. In order to make stocktaking the containers 41 stored in stacks in the container yard, the job procedure list is displayed on the display device provided at the driving position of the yard crane 42 based on a job instruction sent from the host computer. The yard crane 42 moves to the corresponding address in the container yard in accordance with the job order, and receives radio waves from the container number tag 47 applied on each container 41 stored in the container yard by the radio antenna of the yard crane 42, and confirms whether the address of the container 41 being stored and the container number thereof are in accordance with the job order list.

In a case where the corresponding container numbers in the above-mentioned various jobs are not in accordance with the job order list, the operator of the yard crane temporarily puts the container aside in the turnout area and another clerk checks the respective numbers for adjustment.

As has been discussed, according to the third embodiment of the invention, the container number, document information and carriage number are read by the radio antenna on the yard crane. Consequently, excellent effects are obtained such as elimination of a human error and improvement of operation efficiency. Also, it will provide an important tool when automating the management of containers within the container yard in future.

It should be appreciated that the present embodiment is not limited to the form described above and may be changed variously without departing from the scope of the invention.

Figure 35A:
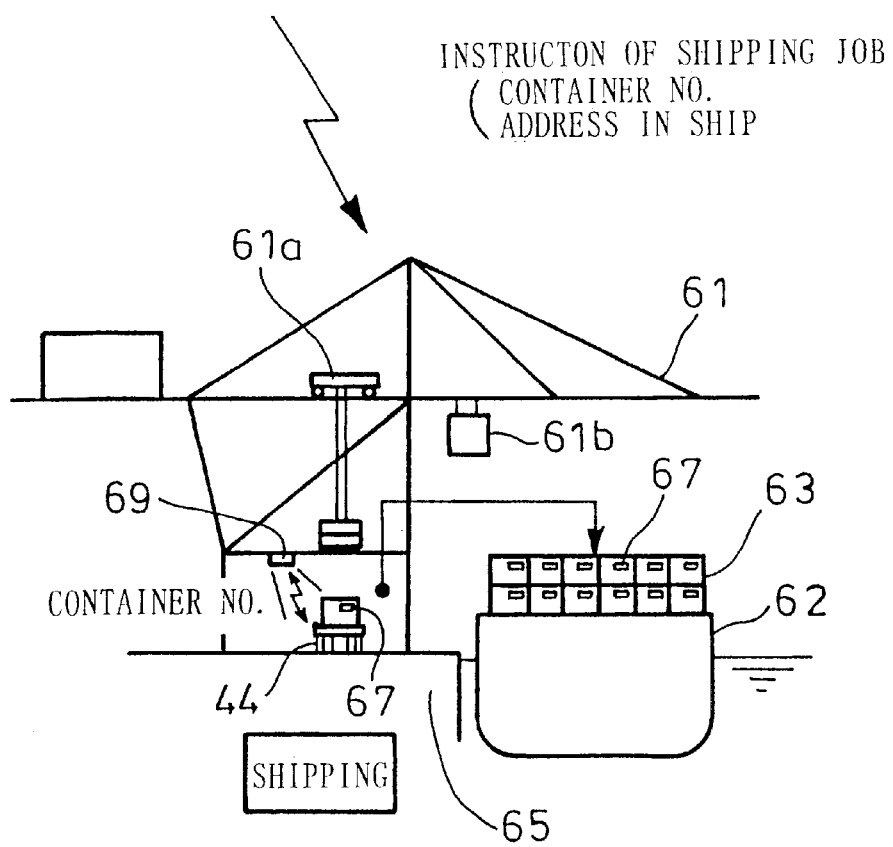
FIGS. 35A and 35B are views showing positional relationship when a container is shipped into or unshipped from a container ship by a container crane, FIG. 35A showing a case of shipping, FIG. 35B showing a case of unshipping.
Figure 35B:
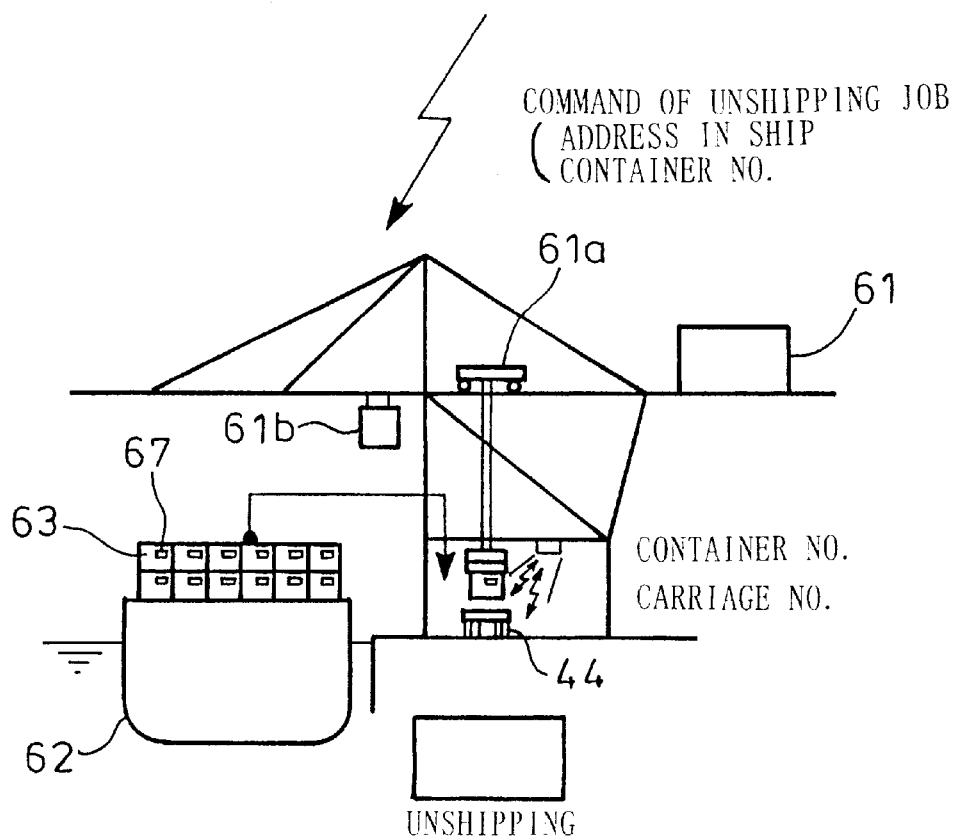
Figure 36:
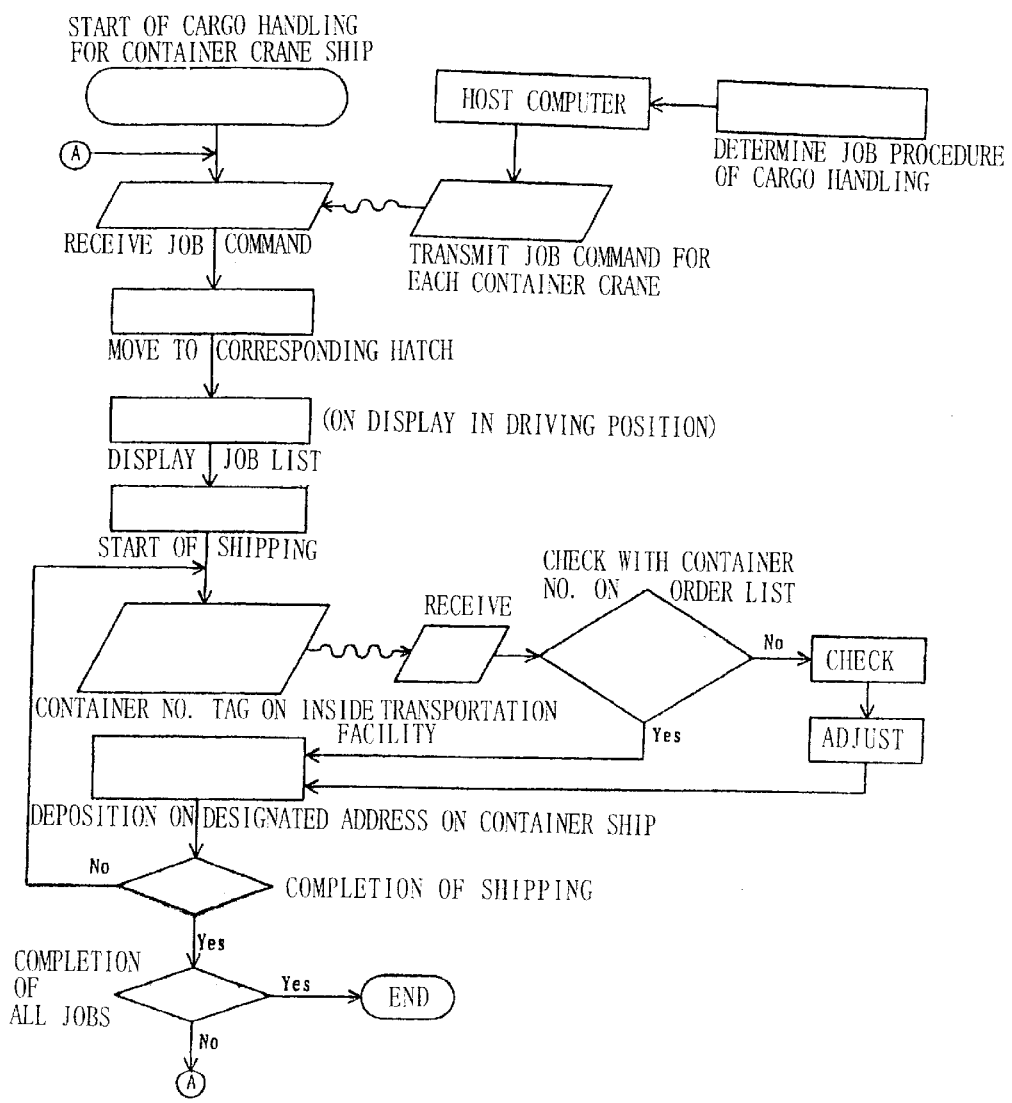
FIG. 36 is a flow sheet showing a flow of shipping.

FIGS. 35 and 36 are views showing a fourth embodiment of the invention to achieve managing apparatus and method in shipping and unshipping of a container.

In these figures, reference numeral 61 denotes a container crane; 62, a container ship; and 63, a container. The container crane 61 is arranged at a quay 65 so as to be allowed to run to unship the container 63 from the container ship 62. Reference numeral 44 denotes an inside transportation carriage (trailer) which transports the container 63 between the container yard and container crane 61. The container carne 61 has a trolley 61a which traverses on the girder and an operating cab 61b which traverses on the same girder.

Reference numeral 67 denotes a container number tag incorporating a radio IC, which is applied on the container 63. Reference numeral 69 denotes a radio antenna on the container crane 61. The radio antenna 69 incorporates, for example, the reader 12 as shown in FIG. 9A of the first embodiment substantially in the same manner as is in the third embodiment. The reader 12 has the coil 12a to transmits radio waves. The container number tag 67 has the radio IC 10a and coil 10b as shown in FIG. 9B of the first embodiment substantially in the same manner as is in the third embodiment; upon receipt of the radio waves from the radio antenna 69, it transmits the container number information which is received by the radio antenna 69 to read the container number. On the other hand, the inside transportation carriage 44 is provided with the carriage number tag 46 applied thereon substantially in the same manner as is in the third embodiment as shown in FIG. 34B and incorporating the radio IC. The structure of the carriage number tag is the same as that of the container number tag.

Next, description will be made, in relation to FIGS. 35A and 36, on the method of managing the shipping of a container. A cargo handling job procedure is inputted to a host computer in the physical distribution information center in the container terminal. The host computer generates a job procedure for each container crane and transmits the same to a small-scale computer in the operating cab 61b of the container crane 61, so that the display device in front of the driving position in the operating cab 61b displays the information. The container crane 61 moves to the corresponding hatch. Since the display device displays the job order in accordance with which the shipping is started. The container number tag 67 on the inside transportation facility (carriage 44) transmits the container number information, which is received by the radio antenna 69. The container number displayed in the job order list is checked up with the container number information from the radio antenna 69, and in a case where the information coincides, the operator manipulates the container crane 61 to put down the container 63 at the designated address inside the container ship 62 in accordance with the job order list. When the deposition of the container 63 has been completed, the operator transmits information thereof to the host computer, and ships the next container in the job order list in the same manner.

Figure 37:
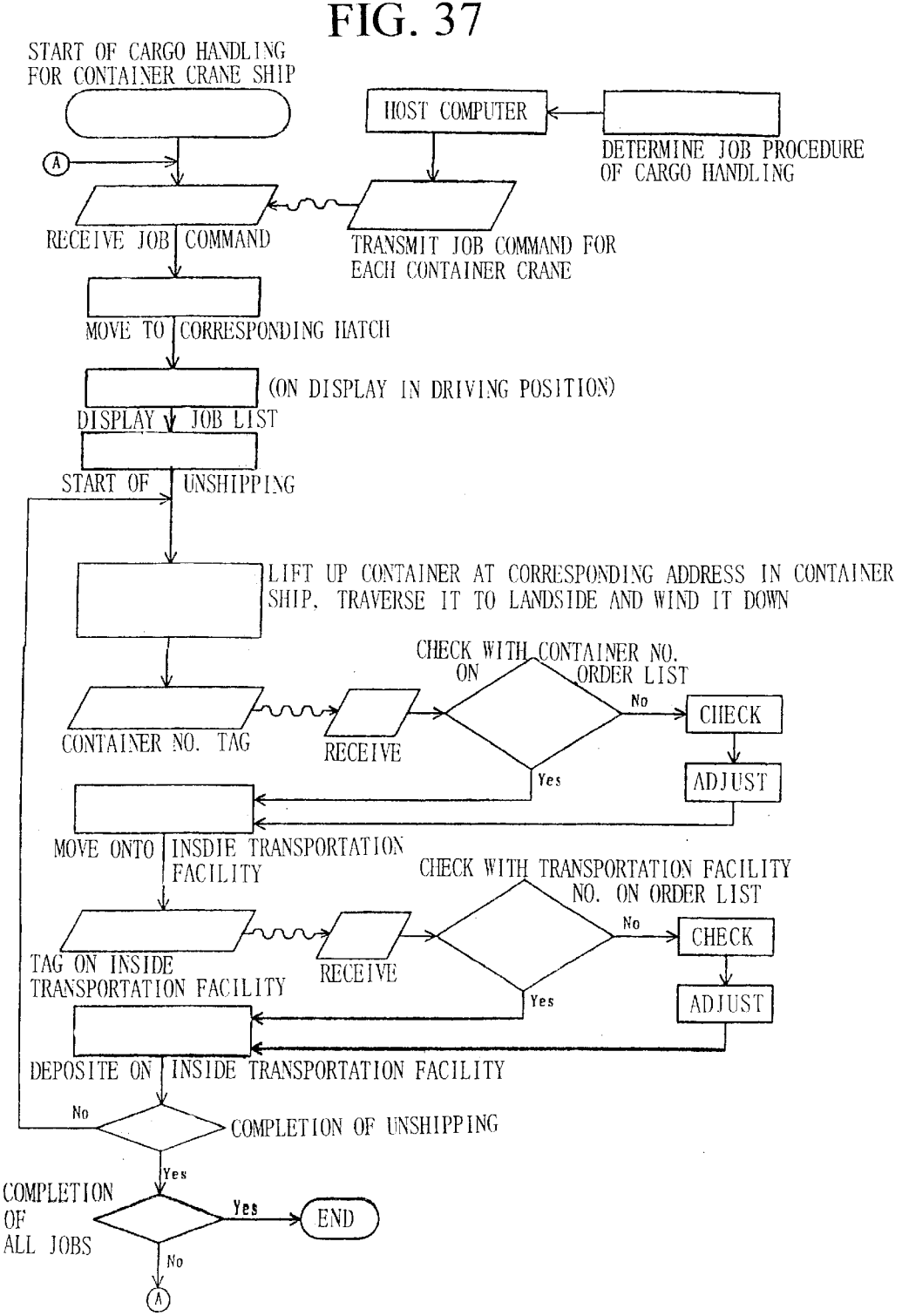
FIG. 37 is a flow sheet showing a flow of unshipping.

Next, the method of unshipping will be described with reference to FIGS. 35B and 37. The procedure up to the job order list being displayed on the display device in the operating cab 61b is the same as that of shipping discussed above, and the explanation is omitted to start the description at the beginning of the unshipping.

In accordance with the job order list, the operator lifts up the container 63 from the corresponding address in the container ship 62, traverses the container 63 to the landside and winds down the container 63. The container number information from the container number tag 67 is received by the radio antenna 69, which is checked up with the job order list. Before the container 63 is deposited on the carriage 44, the carriage number information from the carriage number tag 46 is received by the radio antenna 69. Such information is checked up with the job order list to confirm whether the container in the order of the list is being deposited on the carriage in the order of the list. If correct, the container is deposited just the way it is. The container crane 61 completes the unshipping of the container 63 when it has deposited the container 63 on the carriage 44, and therefore, the operator inputs to that effect, and starts to unship the next container 63.

In a case where the container number and carriage number are found to be different from those in the job order list in the confirmation jobs as discussed above, the operator of the container crane 61 temporarily puts the container 63 aside in the turnout area and another clerk checks the respective numbers for adjustment.

As has been discussed, according to the fourth embodiment of the invention, since the container number and carriage number can be automatically confirmed by the radio antenna on the container crane, a human error is eliminated, thereby making it possible to improve job efficiency. Also, it will provide an important tool when automating the shipping and unshipping of a container in future.

It should be appreciated that the present embodiment is not limited to the form described above and may be changed variously without departing from the scope of the invention. For example, the carriage number tag is not necessarily applied on the carriage; one may confirm the carriage number visually.

FIGS. 38 through 41 are views showing a fifth embodiment of the invention to achieve an inside transportation carriage and an inside transportation method.

Figure 38:
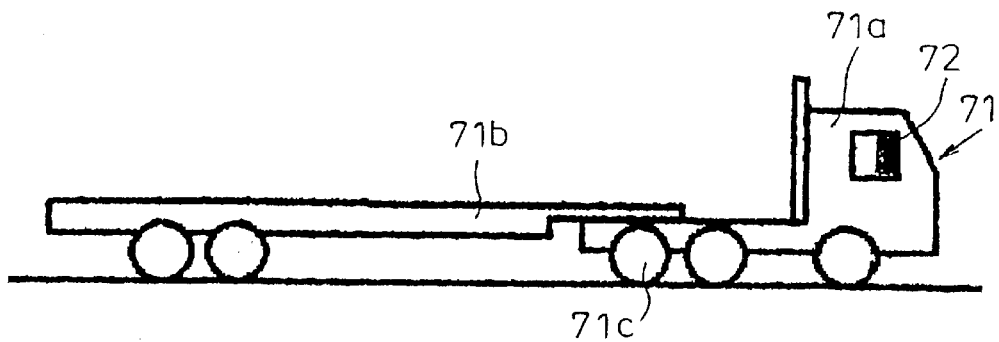
FIG. 38 is a side view of an inside transportation carriage.
Figure 39:
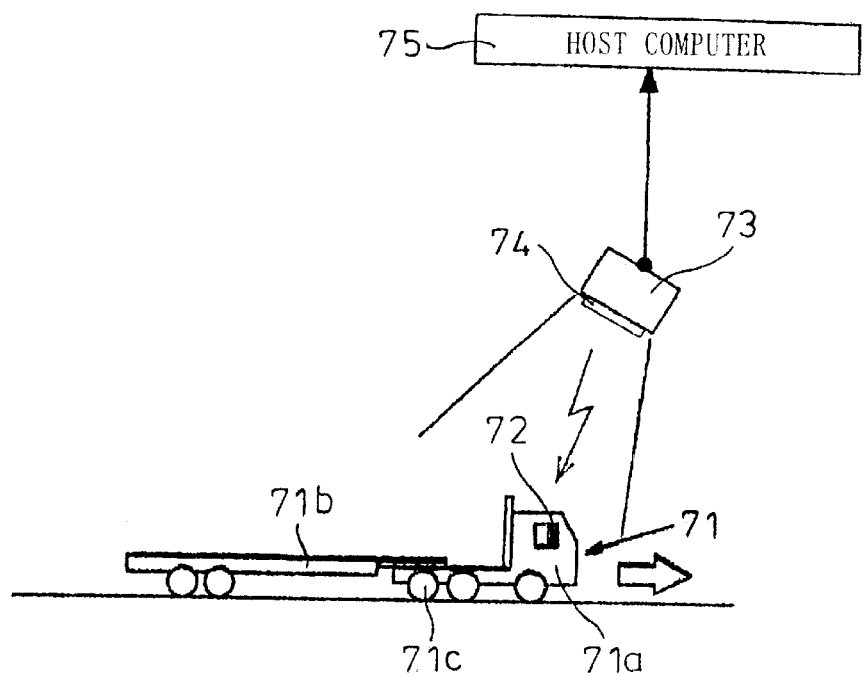
FIG. 39 is a conceptive view showing a state when radio waves are received and transmitted between an inside transportation carriage and a radio antenna in the container yard.
Figure 40:
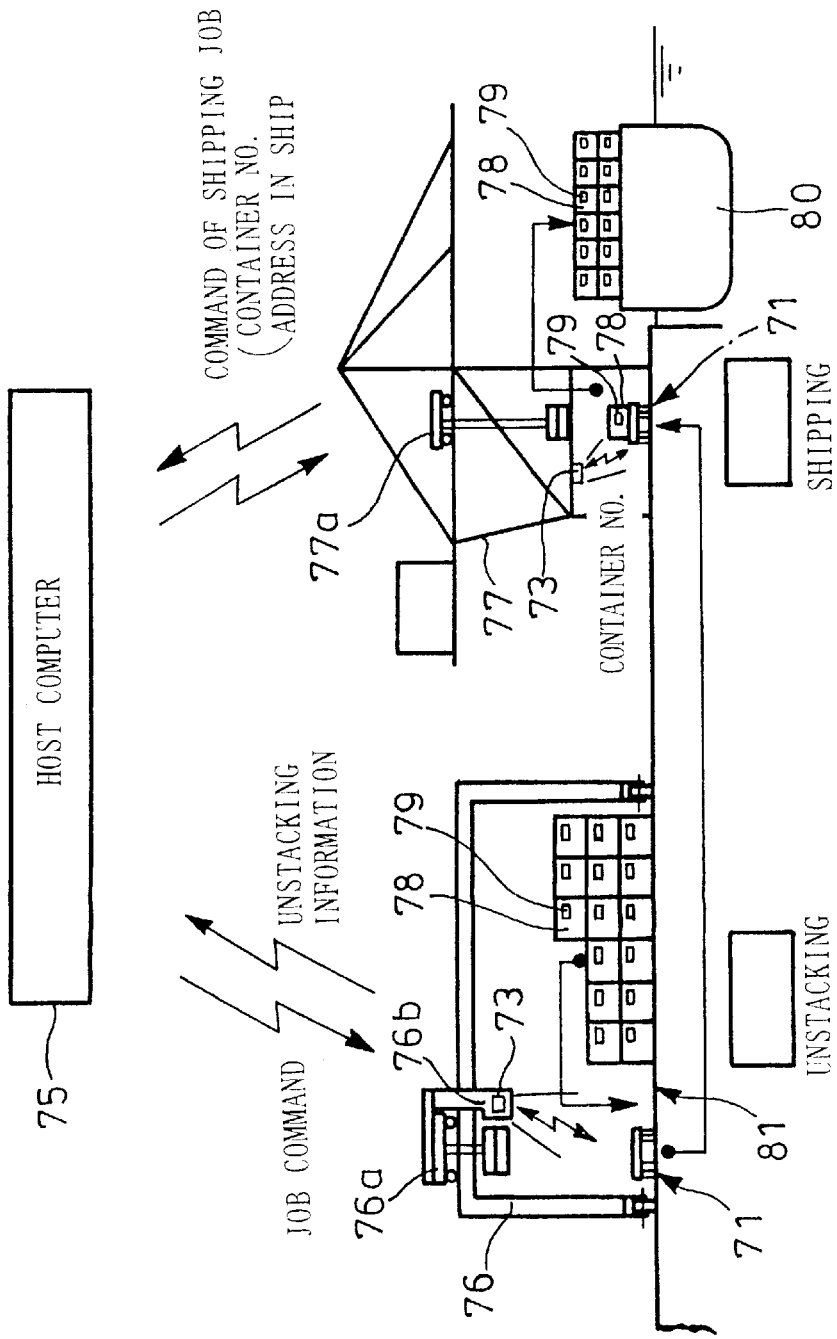
FIG. 40 is a view showing a state when a container is transported from the container yard by an inside transportation carriage for shipping.
Figure 41:
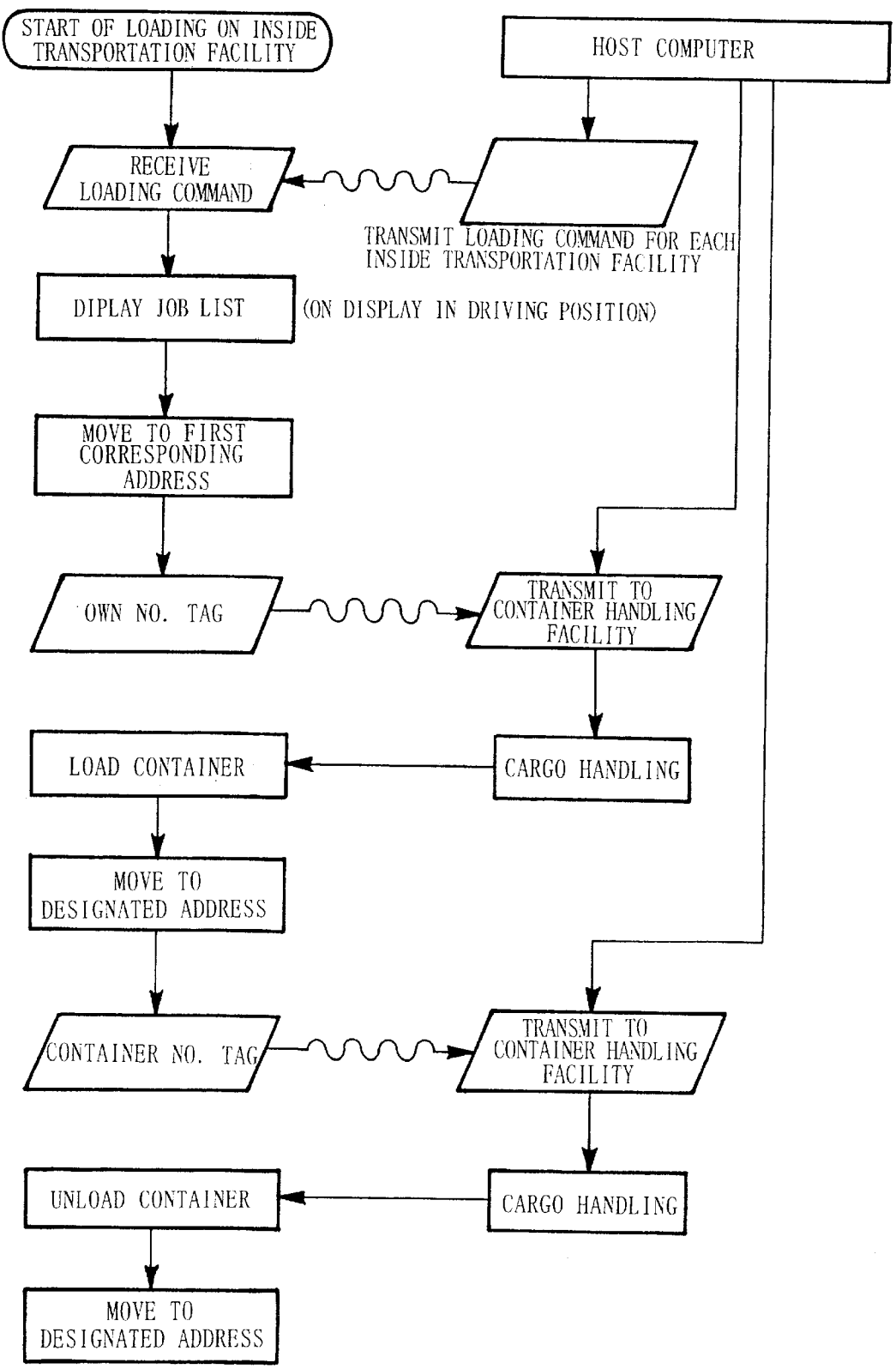
FIG. 41 is a flow sheet showing a flow when a container is loaded and unloaded by an inside transportation carriage.

In FIGS. 38 through 40, reference numeral 71 denotes an inside transportation carriage (trailer). Reference numeral 71a is a tractor head of the inside transportation carriage (trailer) 71; 71b, a chassis; and 71c, wheels. Reference numeral 72 denotes a carriage number tag applied on the tractor head 71a. Reference numeral 73 denotes a radio antenna at a container yard 81, on a yard crane 76 or on a container crane 77. Reference numeral 75 denotes a host computer provided at the container terminal. Reference numeral 78 denotes a container; and 80, a container ship.

As shown in FIG. 40, the inside transportation carriage 71 transports the container 78 between the yard crane 76 and container crane 77 or between the yard crane 76 and another yard crane 76 within the container terminal.

The carriage number tag 72 applied on the tractor head 71a of the inside transportation carriage 71 has, for example, the radio IC 10a and coil 10b as shown in FIG. 9B of the first embodiment, and transmits radio waves transmitting the carriage number information to a radio antenna 73 which will be described below. The radio antenna 73 receives the carriage number information to read the carriage number.

The radio antenna 73 is provided at the container yard 81, on the yard crane 76 or on the container crane 77 within the container terminal. A reader 74 of the radio antenna 73 has, for example, the coil 12a shown in FIG. 9A of the first embodiment, and receives the carriage number information from the carriage number tag 72 applied on the inside transportation carriage 71.

The yard crane 76 has a trolley 76a and an operating cab 76b both traversing on the girder. The operating cab 76b is provided with the radio antenna 73.

The container crane 77 has a trolley 77a which traverses on the girder. The radio antenna 73 is provided on an intermediate coupling member of the container crane 77.

Reference numeral 79 denotes a container number tag applied on the container 78 and incorporating a radio IC. Upon receipt of the radio waves from the radio antenna 73, the container number tag 79 transmits the container number information which is received by the radio antenna 73 to read the container number. The structure of the container number tag 79 is the same as that of the carriage number tag 72.

Next, description will be made on the inside transportation method with reference to FIG. 40. When the container 78 is to be loaded (shipped) into the container ship 80, the inside transportation carriage 71 which has the carriage number tag 72 applied thereon and incorporating the radio IC receives a loading instruction for each inside transportation carriage from the host computer 75, so that the job order list is displayed on the display device at the driving position of the tractor head 71a. Then, the inside transportation carriage 71 is moved to the designated address, and the carriage number tag 72 of the carriage 71 transmits radio waves to the yard crane 76 for reception and transmission of radio waves in relation to the radio antenna 73 on the yard crane 76. The operator of the yard crane 76 obtains the carriage number information, and checks up the information with another job order list sent from the host computer 75. The yard crane 76 confirms the list, and the operator of the yard crane 76 lifts up the container 78 with the number instructed in the job order list among the containers stacked in stages within the container yard 81 and deposits the same on the carriage 71. After the container 78 is deposited thereon, the carriage 71 moves to the designated address in accordance with the job order list, and parks under the container crane 77. When the inside transportation carriage 71 stops, the container number tag 79 of the container 78 deposited on the inside transportation carriage 71 transmits radio waves to the container crane 77 for reception and transmission of radio waves in relation to the radio antenna on the container crane 77. The operator of the container crane 77 confirms that the container number is coincides with that of the job order list he has obtained separately, and puts the container 78 down at the designated address in the container ship 80 where the container with the number in question should be stored. When the deposition of the container 78 is completed, the operator transmits information to that effect to the host computer 75, and ships the next container in accordance with the job order list in the same manner.

In a case where the container number and carriage number have discrepancy with those of the job order list in the confirming jobs discussed above, the operator of the container crane 77 temporarily puts the container 78 aside in the turnout area, and another clerk checks the respective numbers for adjustment.

As has been discussed, according to the fifth embodiment of the invention, the inside transportation carriage number and container number are automatically read with the radio antenna on the yard crane or container crane by labeling the carriage number tag incorporating the radio IC to the inside transportation carriage. As a result, a human error is eliminated, and job efficiency is improved. Also, it will provide an important tool when automating the management of carry-out and -in of a container within the container yard or shipping and unshipping containers in future.

It should be appreciated that the present embodiment is not limited to the form described above and may be changed variously without departing from the scope of the invention. For example, the inside transportation carriage may be a rail type automatic guided carriage, a tire type automatic guided vehicle (AGV), etc. instead of the transportation carriage having the tractor head.

Industrial Applicability

The managing apparatus and method of carry-out and -in of containers in the container terminal are suitable to improve efficiency in transferring a container through radio-controlled and automated operations by allowing information of the container and physical distribution information to be received and transmitted between the radio IC document tag set to the trailer such as the radio IC tag attached to the container and the computer in the physical distribution information center through the radio antenna.

What is claimed is:

1. A container managing method for managing a container via a container managing apparatus, the container managing apparatus including:

a radio IC seal tag having a seal number inputted therein, the radio IC seal tag being attached to closing doors of the container, the container in turn having a radio IC number tag attached thereto, and the radio IC number tag having a container number inputted therein;

a radio IC document tag having physical distribution information of the container inputted therein, the radio IC document tag being set on a trailer;

a radio antenna arranged at an entrance gate of a container terminal of the container, the radio antenna being configured to receive and transmit in relation to all of the radio IC number tag, the radio IC seal tag, and the radio IC document tag;

the radio IC seal tag configured to transmit the seal number only in a state when the closing doors of the container are sealed; and the radio antenna configured to receive the physical distribution information of the container at the entrance gate of the container terminal of the container, to read the container number, to confirm a sealing state of the radio IC seal tag, and to read the seal number, the container managing method comprising the steps of:

upon carry-in of the container in a loaded state thereof and when the trailer passes through the entrance gate, receiving the physical distribution information of the container via the radio antenna, the physical distribution information of the container having been transmitted from the radio IC document tag on the trailer;

simultaneously reading the container number from the radio IC number tag applied on the container and the seal number from the radio IC seal tag;

sending the physical distribution information of the container to a physical distribution information center;

comparing the container number and the seal number with the physical distribution information of the container via a computer in the physical distribution information center for conformation; and data-processing to send a command signal for a storage address to the trailer via the radio antenna.

2. A container managing method for managing a container via a container managing apparatus, the container managing apparatus including:

a radio IC seal tag a radio IC seal tag having a seal number inputted therein, the radio IC seal tag being attached to closing doors of the container, the container in turn having a radio IC number tag attached thereto, and the radio IC number tag having a container number inputted therein;

a radio IC document tag having physical distribution information of the container inputted therein, the radio IC document tag being set on a trailer;

a radio antenna arranged at an entrance gate of a container terminal of the container, the radio antenna being configured to receive and transmit in relation to all of the radio IC number tag, the radio IC seal tag, and the radio IC document tag;

the radio IC seal tag configured to transmit the seal number only in a state when the closing doors of the container are sealed; and the radio antenna configured to receive the physical distribution information of the container at the entrance gate of the container terminal of the container, to read the container number, to confirm a sealing state of the radio IC seal tag, and to read the seal number, the container managing method comprising the steps of:
upon entry of the trailer in an empty state thereof, the trailer being configured to carry-out of the container in either an empty state thereof or a loaded state thereof, and when the trailer passes through the entrance gate, receiving the physical distribution information of the container via the radio antenna, the physical distribution information of the container having been transmitted from the radio IC document tag on the trailer;

sending the physical distribution information of the container to a physical distribution information center;

effecting data-processing via a computer in the physical distribution information center; and sending a command signal for an unstacking address to the trailer via the radio antenna.

3. A container managing method for managing a container via a container managing apparatus, the container managing apparatus including:

a radio IC seal tag having a seal number inputted therein, the radio IC seal tag being attached to closing doors of the container, the container in turn having a radio IC number tag attached thereto, and the radio IC number tag having a container number inputted therein;

a radio IC document tag having physical distribution information of the container inputted therein, the radio IC document tag being set on a trailer;

a radio antenna arranged at an entrance gate of a container terminal of the container, the radio antenna being configured to receive and transmit in relation to all of the radio IC number tag, the radio IC seal tag, and the radio IC document tag;

the radio IC seal tag configured to transmit the seal number only in a state when the closing doors of the container are sealed; and the radio antenna configured to receive the physical distribution information of the container at the entrance gate of the container terminal of the container, to read the container number, to confirm a sealing state of the radio IC seal tag, and to read the seal number, the container managing method comprising the steps of:
in a case of carry-in of the container in an empty state thereof and when the trailer passes through the entrance gate, receiving the physical distribution information of the container via the radio antenna, the physical distribution information of the container having been transmitted from the radio IC document tag on the trailer;

simultaneously reading the container number from the radio IC number tag applied on the container in the empty state thereof sending the physical distribution information of the container to a physical distribution information center;

comparing the container number with the physical distribution information of the container via a computer in the physical distribution information center for confirmation; and data-processing to send a command signal for a storage address to the trailer through the radio antenna.

4. A container managing method for managing a container via a container managing apparatus, the container managing apparatus including:

a radio IC seal tag having a seal number inputted therein, the radio IC seal tag being attached to closing doors of the container, the container in turn having a radio IC number tag attached thereto, and the radio IC number tag having a container number inputted therein;

a radio IC document tag having physical distribution information of the container inputted therein, the radio IC document tag set on a trailer;

a radio antenna arranged at an exit gate of a container terminal of the container, the radio antenna configured to receive and transmit in relation to all of the radio IC number tag, the radio IC seal tag, and the radio IC document tag;

the radio IC seal tag configured to transmit the seal number only in a state when the closing doors of the container are sealed; and the radio antenna configured to receive the physical distribution information of the container at the exit gate of the container terminal of the container, to read the container number, to confirm a sealing state of the radio IC seal tag, and to read the seal number, the container managing method comprising the steps of:
in a case where the trailer, in an empty state thereof is to exit after the trailer has transferred the container, in either an empty state thereof or a loaded state thereof, to a container yard and upon passage of the trailer, in the empty state thereof, through the exit gate, receiving the physical distribution information of the container via the radio antenna, the physical distribution information of the container having been transmitted from the radio IC document tag on the trailer, in an empty state thereof;

sending the physical distribution information of the container to a physical distribution information center; and effecting data-processing on the physical distribution information of the container via a computer in the physical distribution information center; and sending a command signal for exit permission to the trailer, in the empty state thereof, via the radio antenna.

5. A container managing method for managing a container via a container managing apparatus, the container managing apparatus including:

a radio IC seal tag having a seal number inputted therein, the radio IC seal tag being attached to closing doors of the container, the container in turn having a radio IC number tag attached thereto, and the radio IC number tag having a container number inputted therein;

a radio IC document tag having physical distribution information of the container inputted therein, the radio IC document tag set on a trailer;

a radio antenna arranged at an exit gate of a container terminal of the container, the radio antenna being configured to receive and transmit in relation to all of the radio IC number tag, the radio IC seal tag, and the radio IC document tag;

the radio IC seal tag configured to transmit the seal number only in a state when the closing doors of the container are sealed; and the radio antenna configured to receive the physical distribution information of the container at the exit gate of the container terminal of the container, to read the container number, to confirm a sealing state of the radio IC seal tag, and to read the seal number, the container managing method comprising the steps of:

in a case of carry-out of the container in a loaded state thereof and upon passage of the trailer through the exit gate, receiving the physical distribution information of the container via the radio antenna, the physical distribution information of the container having been transmitted from the radio IC document tag on the trailer;

simultaneously reading the container number from the radio IC number tag applied on the container and the seal number from the radio IC seal tag;

confirming the sealing state of the radio IC seal tag;

sending the physical distribution information of the container to a physical distribution information center;

comparing the container number and the seal number with the physical distribution information of the container via a computer in the physical distribution information center for confirmation; and data-processing to send a command signal for an exit permission to the trailer through the radio antenna.

6. A container managing method for managing a container via a container managing apparatus, the container managing apparatus including:

a radio IC seal tag having a seal number inputted therein, the radio IC seal tag being attached to closing doors of the container, the container in turn having a radio IC number tag attached thereto, and the radio IC number tag having a container number inputted therein;

a radio IC document tag having physical distribution information of the container inputted therein, the radio IC document tag being set on a trailer;

a radio antenna arranged at an exit gate of a container terminal of the container, the radio antenna configured to receive and transmit in relation to all of the radio IC number tag, the radio IC seal tag, and the radio IC document tag;

the radio IC seal tag configured to transmit the seal number only in a state when the closing doors of the container are sealed; and the radio antenna configured to receive the physical distribution information of the container at the exit gate of the container terminal of the container, to read the container number, to confirm a sealing state of the radio IC seal tag, and to read the seal number, the container managing method comprising the steps of:

in a case of carry-out of the container in an empty state thereof and upon passage of the trailer through the exit gate, receiving the physical distribution information of the container via the radio antenna, the physical distribution information being transmitted from the radio IC document tag on the trailer;

simultaneously reading the container number from the radio IC number tag applied on the container;

sending the physical distribution information of the container to a physical distribution center;

comparing the container number with the physical distribution information of the container via a computer in the physical distribution information center for confirmation; and data-processing to send a command signal for exit permission to the trailer through the radio antenna.

* * * * *